(12) United States Patent
Tomoda

(10) Patent No.: US 11,508,409 B2
(45) Date of Patent: Nov. 22, 2022

(54) MAGNETIC DISK DEVICE AND WRITE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yusuke Tomoda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/408,143

(22) Filed: Aug. 20, 2021

(65) Prior Publication Data

US 2022/0262400 A1    Aug. 18, 2022

(30) Foreign Application Priority Data

Feb. 16, 2021 (JP) .............................. JP2021-022478

(51) Int. Cl.
*G11B 20/12* (2006.01)
*G11B 5/012* (2006.01)

(52) U.S. Cl.
CPC ......... *G11B 20/1217* (2013.01); *G11B 5/012* (2013.01); *G11B 2020/1238* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 9,070,406 B1* | 6/2015 | Li | G11B 20/10268 |
| 9,286,926 B1* | 3/2016 | Dhanda | G11B 5/59688 |
| 9,305,595 B2 | 4/2016 | Hwang et al. | |
| 9,378,763 B1* | 6/2016 | Kim | G11B 27/36 |
| 9,437,232 B1* | 9/2016 | Galbraith | G11B 5/59627 |
| 10,008,228 B1* | 6/2018 | Nangare | G11B 20/10314 |
| 10,068,597 B1* | 9/2018 | Jury | G11B 5/3948 |
| 10,510,373 B1* | 12/2019 | Granz | G11B 20/10472 |
| 2006/0232874 A1* | 10/2006 | Tsuchinaga | G11B 5/012 360/75 |

(Continued)

FOREIGN PATENT DOCUMENTS

JP    2021-34086 A    3/2021

*Primary Examiner* — Peter Vincent Agustin
(74) *Attorney, Agent, or Firm* — Allen & Overy LLP

(57) ABSTRACT

According to one embodiment, a magnetic disk device includes a disk including a normal recording region written in a normal recording and a shingled recording region written in a shingled recording, a head including a write head and a plurality of read heads, the head moving on the disk by rotation about a rotation axis, and a controller which selects and executes the normal recording and the shingled recording, wherein a first minimum value of a cross track interval in the radial direction of the disk between two read heads in the plurality of read heads in the normal recording region is smaller than a first maximum value of the cross track interval in the shingled recording region.

20 Claims, 26 Drawing Sheets

(56) References Cited

U.S. PATENT DOCUMENTS

| | | | |
|---|---|---|---|
| 2008/0310053 A1* | 12/2008 | Kim | G11B 5/743 |
| | | | 360/135 |
| 2014/0019680 A1* | 1/2014 | Jin | G11B 20/1217 |
| | | | 711/112 |
| 2019/0066715 A1* | 2/2019 | Aoki | G11B 20/1217 |
| 2019/0244638 A1* | 8/2019 | Boyle | G11B 5/09 |
| 2021/0065736 A1 | 3/2021 | Tomoda | |

* cited by examiner

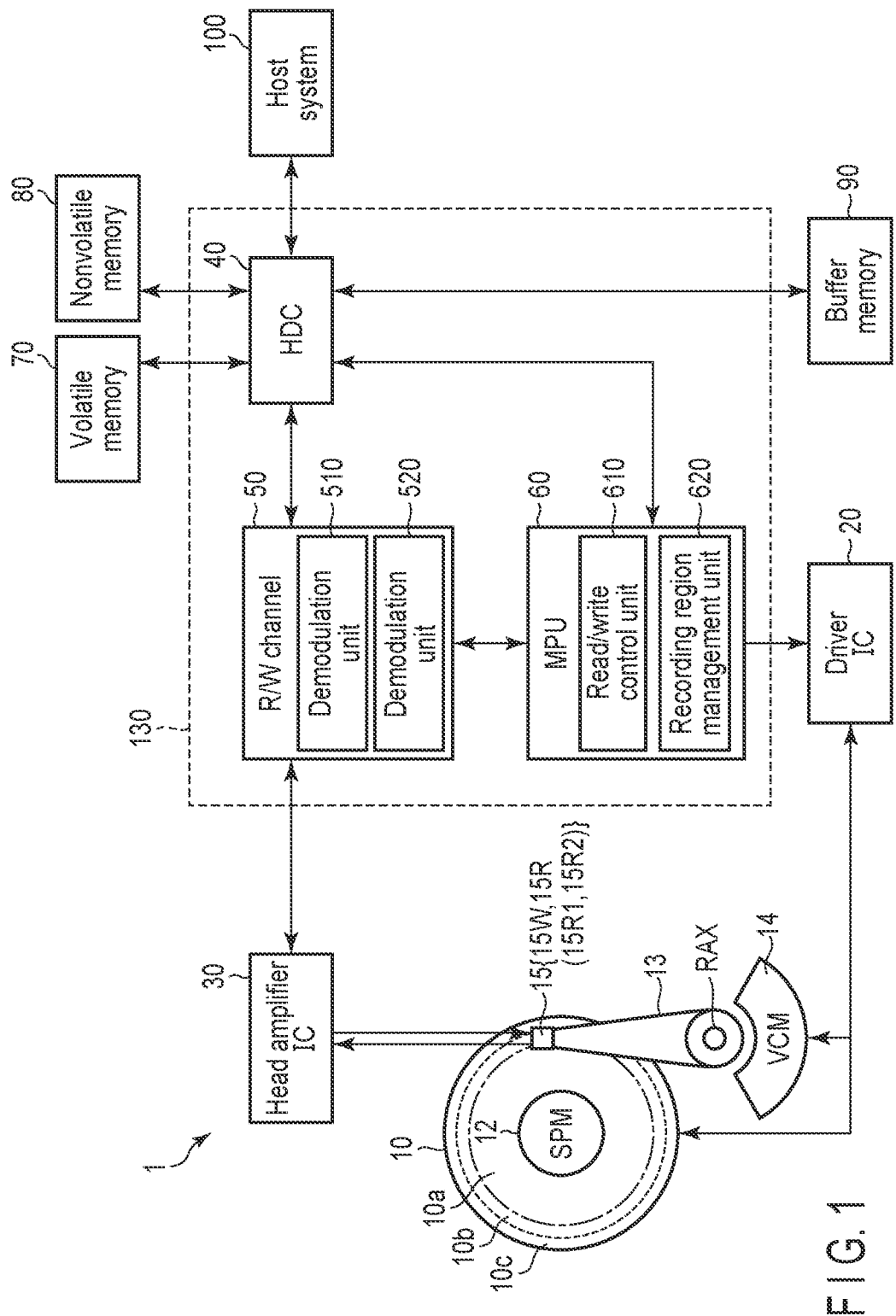
F I G. 1

F.I.G. 6

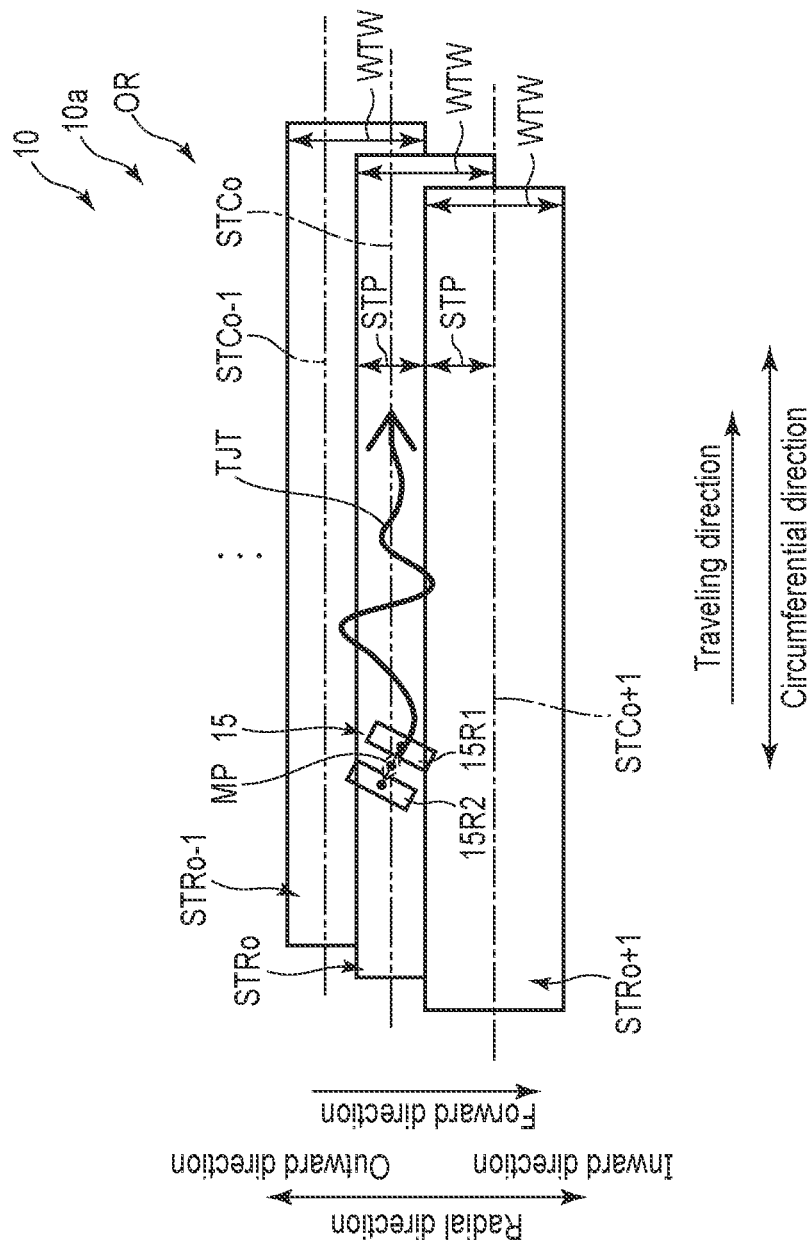
F I G. 11

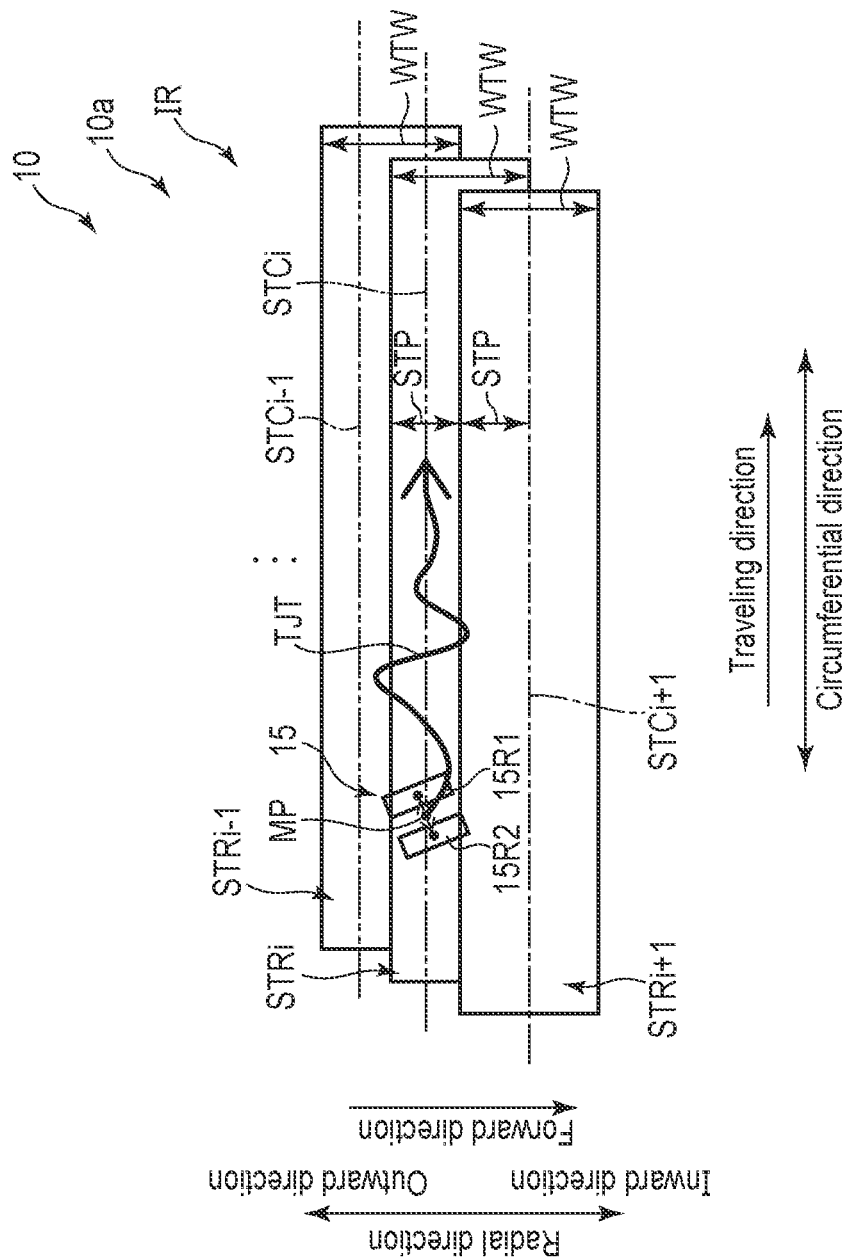
F I G. 13

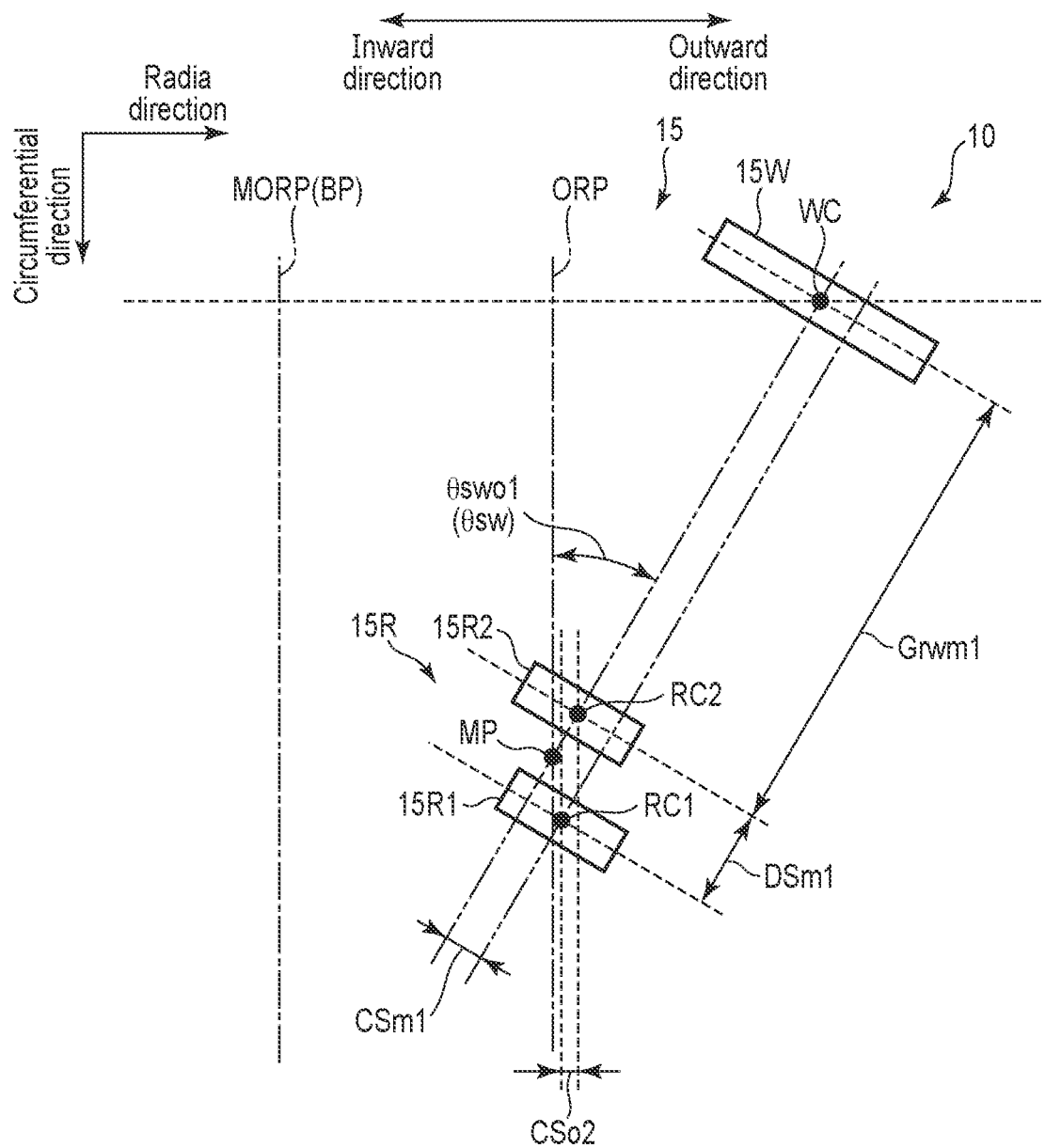
F I G. 26

MAGNETIC DISK DEVICE AND WRITE PROCESSING METHOD

CROSS-REFERENCE TO RELATED APPLICATIONS

This application is based upon and claims the benefit of priority from Japanese Patent Application No. 2021-022478, filed Feb. 16, 2021, the entire contents of which are incorporated herein by reference.

FIELD

Embodiments described herein relate generally to a magnetic disk device and a write processing method.

BACKGROUND

There are a conventional magnetic recording (CMR) type magnetic disk device that writes a plurality of tracks at intervals in a radial direction of a disk and a shingled recording (Shingled write Magnetic Recording: SMR, or Shingled Write Recording: SWR) type magnetic disk device that overwrites a plurality of tracks in the radial direction of a disk. Nowadays, a magnetic disk device capable of selecting and executing a normal recording mode and a shingled recording mode is being developed.

A two-dimensional magnetic recording (TDMR) type magnetic disk device having a plurality of read heads is being developed. In the TDMR type magnetic disk device, an interval (cross track interval: CTS) in a direction intersecting with tracks of two read heads in a plurality of read heads changes according to a skew angle of the head.

BRIEF DESCRIPTION OF THE DRAWINGS

FIG. 1 is a block diagram illustrating the configuration of a magnetic disk device according to an embodiment.

FIG. 6 is a schematic diagram illustrating an example of read processing of data normally recorded in a middle circumferential region.

FIG. 11 is a schematic diagram illustrating an example of read processing of data shingle-recorded in the outer circumferential region.

FIG. 13 is a schematic diagram illustrating an example of read processing of data shingle-recorded in the inner circumferential region.

FIG. 26 is a schematic diagram illustrating an example of the geometric arrangement of a write head and two read heads in the case in which the intermediate part according to the second modification is positioned at a radial position.

DETAILED DESCRIPTION

Figure 2:
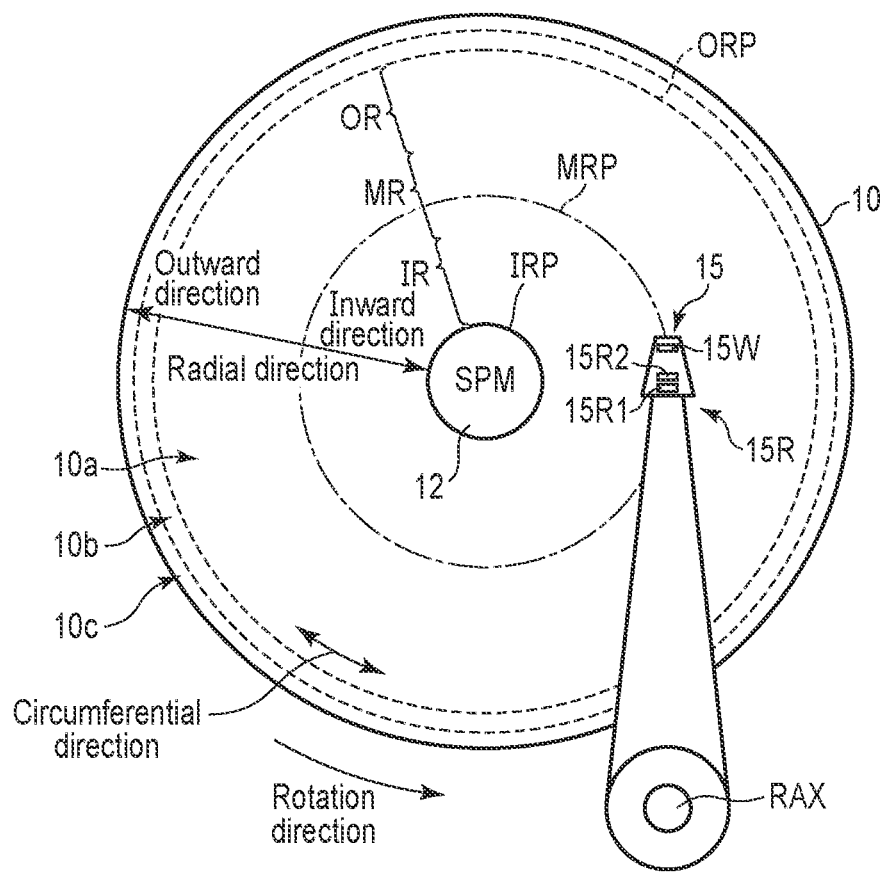
FIG. 2 is a schematic diagram illustrating an example of the arrangement of heads to a disk according to an embodiment.

In general, according to one embodiment, a magnetic disk device comprises: a disk including a normal recording region in which data is written in a normal recording in which a track is written at an interval in a radial direction and a shingled recording region in which data is written in a shingled recording in which a track is written in an overlapping manner in the radial direction; a head including a write head which writes data to the disk and a plurality of read heads which read data from the disk, the head moving on the disk by rotation about a rotation axis; and a controller which selects and executes the normal recording and the shingled recording, wherein a first minimum value of a cross track interval in the radial direction of the disk between two read heads in the plurality of read heads in the normal recording region is smaller than a first maximum value of the cross track interval in the shingled recording region.

In the following, an embodiment will be described with reference to the drawings. It should be noted that the drawings are merely examples, and do not limit the scope of the invention.

Embodiment

FIG. 1 is a block diagram illustrating the configuration of a magnetic disk device 1 according to an embodiment.

The magnetic disk device 1 includes a head disk assembly (HDA) described later, a driver IC 20, a head amplifier integrated circuit (in the following, a head amplifier IC or a preamplifier) 30, a volatile memory 73, a nonvolatile memory 80, a buffer memory (buffer) 90, and a system controller 130 that is a one-chip integrated circuit. The magnetic disk device 1 is connected to a host system (host) 100. The magnetic disk device 1 is a two-dimensional magnetic recording (TDMR) magnetic disk device, for example.

The HDA has a magnetic disk (in the following, sometimes referred to as a disk):0, a spindle motor (SPM) 12, an arm 13 on which a head 15 is mounted, and a voice coil motor (VCM) 14. The disk 10 is attached to the spindle motor 12 and rotates by drive of the spindle motor 12. The arm 13 and the VCM 14 constitute an actuator. The rotational drive of the VCM 14 causes the arm 13 to rotate about a rotation shaft (or bearing) RAX, and the actuator moves and controls the head 15 mounted on the arm 13 to a particular position of the disk 10. In other words, the head 15 is rotated about the rotation axis RAX, and moves on the disk 10. Two or more disks 10 and heads 15 may be provided.

In the disk 10, a user data region 10a available from a user, a media cache (or a media cache region) 10b that temporarily holds data (or a command) transferred from the host 100 and any other device before the data is written to a particular region of the user data region 10a, and a system region 10c in which information necessary for system management is written are allocated in a region in which the data is writable. In the following, a direction from the inner circumference to the outer circumference of the disk 10 or a direction from the outer circumference to the inner circumference of the disk 10 is referred to as a radial direction. In the radial direction, a direction from the inner circumference to the outer circumference is referred to as an outward direction (outer side), and a direction from the inner circumference to the outer circumference is referred to as an inward direction (inner side). A direction orthogonal to the radial direction of the disk 10 is referred to as a circumferential direction. The circumferential direction corresponds to a direction along the circumference of the disk 10. A particular position in the radial direction of the disk 10 is sometimes referred to as a radial position, and a particular position in the circumferential direction of the disk 10 is sometimes referred to as a circumferential position. The radial position and the circumferential position area are sometimes collectively simply referred to as a position. The disk 10 is divided into a plurality of regions (in the following, sometimes referred to as a zone) for each particular range in the radial direction. The zone can be divided into a plurality of regions (in the following, sometimes referred to as a band region) for each particular range in the radial direction. A plurality of tracks can be written in the band region. The track includes a plurality of sectors. A region obtained by dividing the disk 10 in the radial direction is sometimes referred to as a radial region. The radius region includes a zone, a band region, a track, and the like. It should be noted that the "track" is used as one region in a plurality of regions divided in the radial direction of the disk 10, a path of the head 15 at a particular radial position, data extending in the circumferential direction of the disk 10, data for one cycle written to a track at a particular radial position, data written to the track, and various other meanings. The "sector" is used as one region in a plurality of regions obtained by dividing the track in the circumferential direction, data written at a particular position of the disk 10, data written in a sector, or various other meanings. The "radial width of a track" is sometimes referred to as a "track width". The "path passing the center position of the track width in a particular track" is referred to as a "track center". The term "user data region" is sometimes used to mean "a part of a user data region", "one user data region in the plurality of user data regions", "several user data regions in the plurality of user data regions", or "all user data regions of the disk 10". The term "media cache" is sometimes used to mean "a part of media cache", "one media cache in multiple media caches", "the number of media caches in the plurality of media caches", or "all media caches of the disk 10".

The head 15 includes a write head 15W and a read head 15R mounted on a slider as a main body. The write head 15W writes data to the disk 10. The read head 15R reads data recorded on the disk 10. The read head 15R has a plurality of read heads, e.g. two read heads 15R1 and 15R2. The read head 15R1 is provided, e.g. at a position the farthest from the write head 15W. The read head 15R2 is provided, e.g. at a position next to the read head 15R1 from the write head 15W. In other words, the read head 15R2 is located between the write head 15W and the read head 15R1. Tt should be noted that the read head 15R may have three or more read heads. In the following, the plurality of read heads, e.g. the two read heads 15R1 and 15R2 area sometimes collectively referred to as the read head 15, or any one of the plurality of read heads, e.g. the read heads 15R1 and 15R2 is sometimes simply referred to as the read head 15R.

FIG. 2 is a schematic diagram illustrating an example of the arrangement of the head 15 to the disk 10 according to the present embodiment. As illustrated in FIG. 2, in the circumferential direction, a direction in which the disk 10 rotates is referred to as a rotation direction. It should be noted that in the example illustrated in FIG. 2, although the rotation direction is indicated in the counterclockwise direction, the rotation direction may be the opposite direction (clockwise direction).

In the example illustrated in FIG. 2, the user data region 10a is divided into an inner circumferential region IR located in the inward direction, an outer circumferential region OR located in the outward direction, and a middle circumferential region MR located between the inner circumferential region IR and the outer circumferential region OR. In the user data region 10a, the inner circumferential region IR corresponds to a region located at the innermost circumference, and the outer circumferential region OR corresponds to a region located at the outermost circumference. In the user data region 10a, the middle circumferential region MR is adjacent to the inner circumferential region IR in the outward direction, and the outer circumferential region OR is adjacent to the middle circumferential region MR in the outward direction. In other words, in the user data region 10a, the middle circumferential region MR is adjacent to the outer circumferential region OR in the inner direction, and the inner circumferential region IR is adjacent to the middle circumferential region MR in the inner direction. Here, "adjacent" includes not only data, an object, a region, a space, and the like that are arranged in contact with each other, but also data, an object, a region, a space, and the like that are arranged at particular intervals. In FIG. 2, the user data region 10a includes a radial position IRP, a radial position MRP, and a radial position ORP. The radial position IRP corresponds to the radial position of the innermost circumference of the user data region 10a. The radial position ORP corresponds to the radial position of the outermost circumference of the user data region 10a. The radial position MRP corresponds to the radial position of the center of the width of the user data region 10a in the radial direction, e.g. a radial position in between the radial positions IRP and ORP. It should be noted that the radial position. MRP may correspond to the radial position of the center of the radial width of the disk 10. In the example illustrated in FIG. 2, in the case in which the head 15 is disposed at the radial position MRP, a skew angle θsw is, e.g. 0°.

Although not illustrated, the disk 10 has a plurality of servo patterns. The plurality of servo patterns radially extends in the radial direction of the disk 10 and is discretely disposed at particular intervals in the circumferential direction. The servo pattern includes servo data and any other data for positioning the head 15 at a particular position on the disk 10. In the user data region 10a other than the servo pattern, data (sometimes referred to as user data) other than the servo data can be written. It should be noted that the "servo pattern" is sometimes referred to as a "servo region" or a "servo data". The servo pattern includes, e.g. a preamble PRB, a servo mark SM, a gray code GC, a PAD PD, burst data, and a post code PC. It should be noted that the servo pattern does not necessarily include the post code PC.

The actuator (the arm 13 and the VCM 14) rotates about the rotation axis RAX during a seek, and the head 15 slides in the horizontal plane of the disk 10. In the example illustrated in FIG. 2, in the case in which the head 15 is disposed at the radial position MRP, the head 15 is located along the circumferential direction. The head 15 is inclined to the circumferential direction on the disk 10 by rotating about the rotation axis RAX according to the rotation of the actuator.

Figure 3:
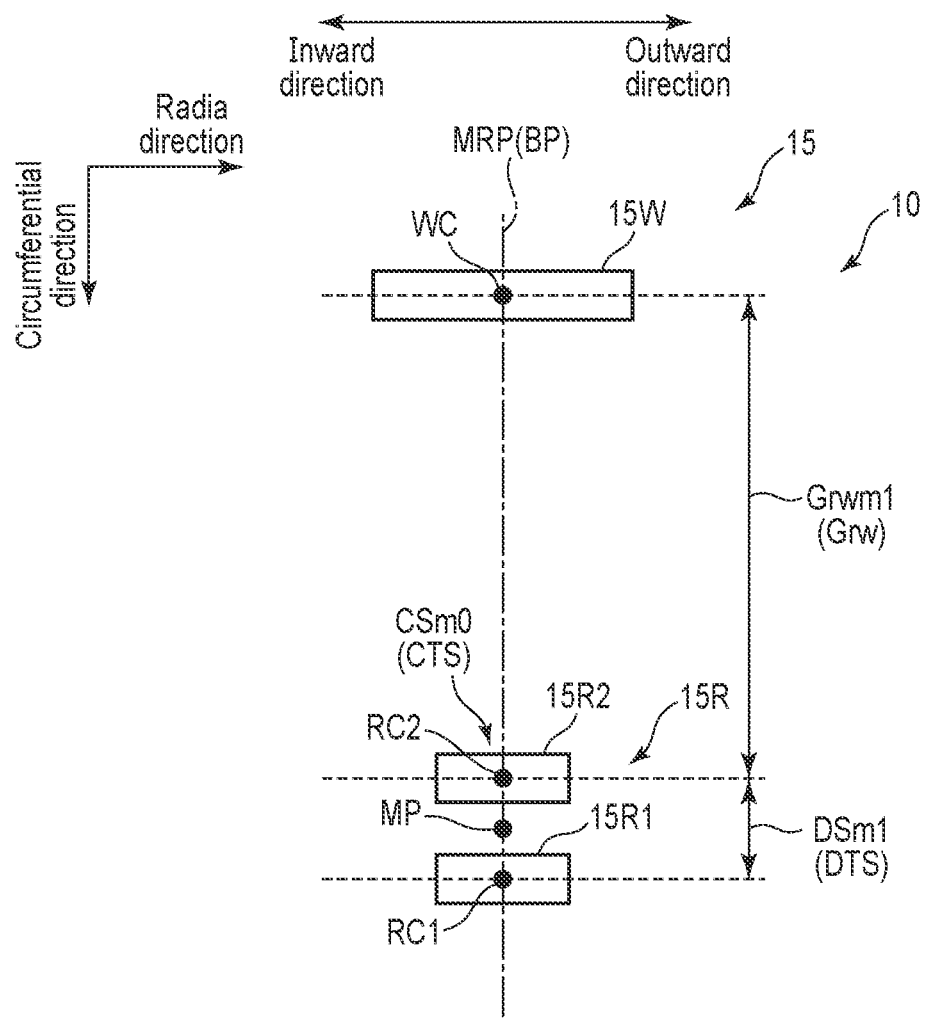
FIG. 3 is a schematic diagram illustrating an example of the geometric arrangement of a write head and two read heads in the case in which an intermediate part is positioned at a radial position.

FIG. 3 is a schematic diagram illustrating an example of the geometric arrangement of the write head 15W and the two read heads 15R1 and 15R2 in the case in which the intermediate part MP is positioned at the radial position MRP. FIG. 3 illustrates a center part WC of the write head 15W, a center part RC1 of the read head 15R1, a center part RC2 of the read head 15R2, and an intermediate part MP located in the middle in the circumferential direction between the center part RC1 of the read head 15R1 and the center part RC2 of the read head 15R2. In the following, the interval in the circumferential direction between two read heads 15R in the plurality of read heads 15R is sometimes referred to as a down track separation (DTS). The radial interval between two read heads 15R in the plurality of read heads 15R is sometimes referred to as a cross track separation (CTS). The interval between the read head 15R and the write head 15W, e.g. the interval in the circumferential direction between the center part RC1 of the read head 15R1 and the center part WC of the write head 15W, the interval in the circumferential direction between the center part RC2 of the read head 15R2 and the center part WC of the write head 15W, and the interval in the circumferential direction between the intermediate part MP and the center part WC of the write head 15W is sometimes referred to as a read/write gap Grw. For convenience of description, "the center part of write head" and "each part of write head" are sometimes simply referred to as "the write head", and "the center part of read head", "the intermediate part of two of the plurality of read heads", and "components of read head" are sometimes simply referred to as "the read head". Any one of the plurality of read heads 15R and an intermediate part of two read heads 15R in the plurality of read heads 15R is disposed or positioned at a target position (in the following, sometimes referred to as a target position), and data is written/read. For example, the intermediate part MP is disposed or positioned at a target position, and data is written/read. The term "dispose or position the intermediate part MP at a target position" is sometimes referred to as "dispose or position the read head 15R at the target position". It should be noted that "to dispose or position one read head 15R in the plurality of read heads 15R at a target position" is sometimes expressed as "to dispose or position the read head 15R at the target position". For example, "to dispose or position intermediate part MP at the target position to write/read data" is sometimes expressed as "to write/read". It should be noted that "to dispose or position one read head 15R in the plurality of read heads 15R at a target position to write/read data" is sometimes expressed as "to write/read". In addition, "to dispose or position a plurality of read heads 15R at target positions to write/read data" is sometimes expressed as "to write/read".

In the example illustrated in FIG. 3, in the case in which the intermediate part MP is disposed at the intermediate position MRP, the write head 15W, the read head 15R1, the read head 15R2, and the intermediate part MP are arranged along the circumferential direction. In the case in which the intermediate part MP is disposed at the radial position MRP, the read/write gap Grw is the distance Grwm1. In the case in which the intermediate part MP is disposed at the radial position MRP, the down track interval (DTS) is the distance DSm1. For example, the read/write gap Grw=Grwm1 is larger than the down track interval=DSm1.

In the example illustrated in FIG. 3, in the case in which the intermediate part MP is disposed at the radial position MRP, the write head 15W, the read head 15R1, the read head 15R2, and the intermediate part MP are not displaced in the radial direction. In other words, in FIG. 3, the write head 15W, the read head 15R1, the read head 15R2, and the intermediate part MP are located at the radial position MRP. That is, in FIG. 3, the skew angle θsw of the head 15 is 0°. In the case in which the intermediate part MP is disposed at the radial position MRP, the cross track interval (CTS) is a minimum value, e.g. the distance CSm0=0. It should be noted that in the case in which the intermediate part MP is disposed at the radial position MRP, the write head 15W, the read head 151, the read head 15R2, and the intermediate part MP may be displaced in the radial direction. In the following, "a radial position at which a cross track interval between at least one pair of two read heads in a plurality or read heads 15R provided in one head 15 takes a minimum value in the disk 10, e.g. the user data region 10a" is sometimes referred to as a "reference position". In the example illustrated in FIG. 3, the radial position MRP corresponds to a reference position BP.

Figure 4:
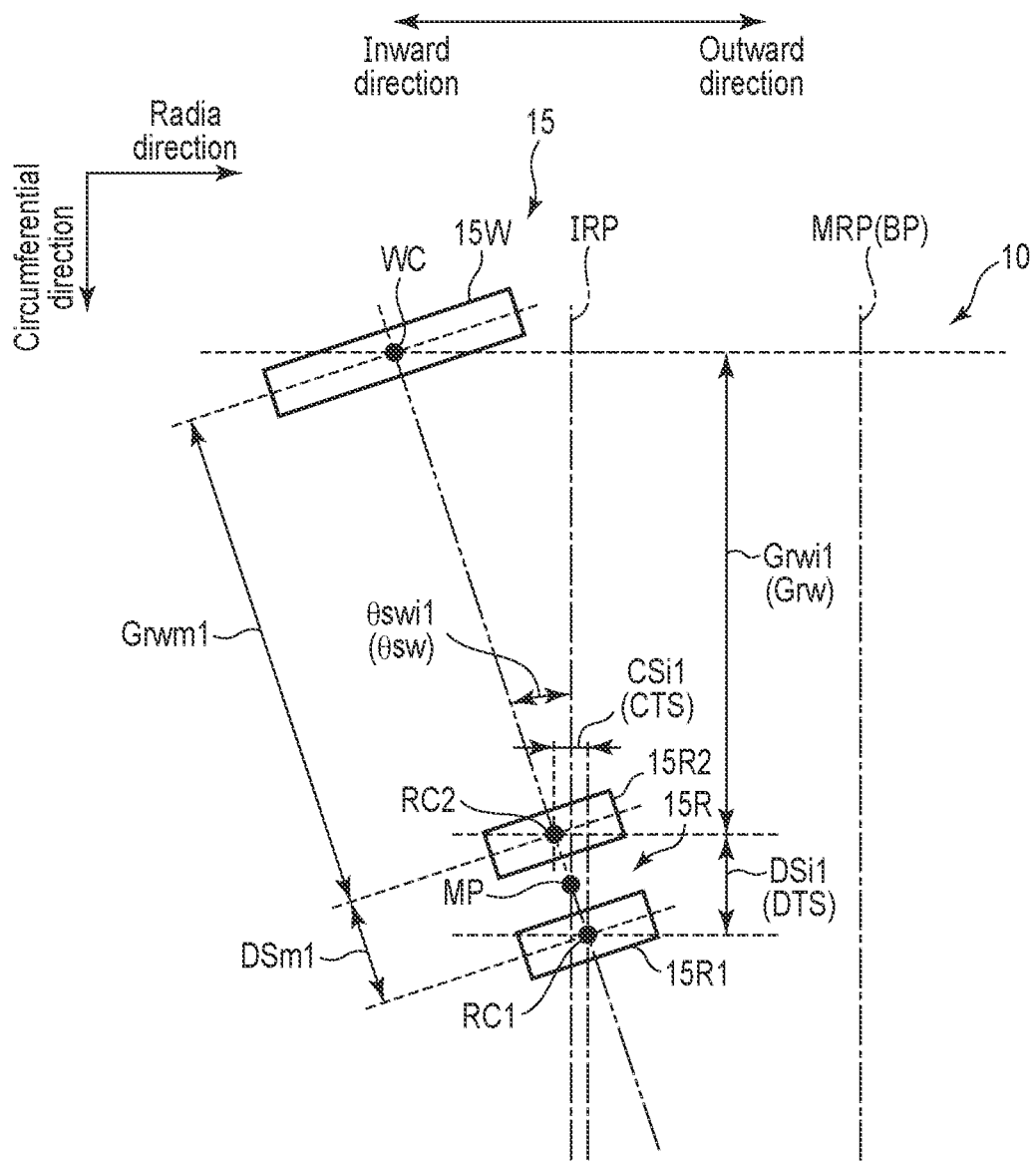
FIG. 4 is a diagram illustrating an example of the geometrical arrangement of a write head and two read heads in the case in which the intermediate part is positioned at a radial position.

FIG. 4 is a diagram illustrating an example of the geometric arrangement of the write head 15W and the two read heads 15R1 and 15R2 in the case in which the intermediate part MP is positioned at the radial position IRP.

In the example illustrated in FIG. 4, in the case in which the intermediate part MP is disposed at the radial position IRP, the write head 15W, the read head 15R1, the read head 15R2, and the intermediate part MP are inclined inward at a skew angle θsw=θswi1 to an axis extending in the circumferential direction. In the case in which the intermediate part MP is disposed at the radial position IRP, the read/write gap Grw is a distance Grwi1. In the case in which the intermediate part MP is disposed at the radial position IRP, the down track interval (DTS) is a distance DSi1.

In the example illustrated in FIG. 4, in the case in which the intermediate part MP is disposed at the radial position IRP, the write head 15W, the read head 15R1, the read head 15R2, and the intermediate part MP are displaced in the radial direction. It should be noted that in the case in which the intermediate part MP is disposed at the radial position IRP, the write head 15W, the read head 15R1, the read head 15R2, and the intermediate part MP do not necessarily have to be displaced in the radial direction. In the case in which the intermediate part MP is disposed at the radial position IRP, the cross track interval (CTS) is a distance CSi1. The absolute value of the cross track interval CSi1 is the maximum value of the absolute value of the cross track interval in the case in which the head 15, e.g. the intermediate part MP is positioned in the user data region 10a. It should be noted that the absolute value of the cross track interval CSi1 does not necessarily have to be the maximum value of the absolute value of the cross track interval in the case in which the head 15, e.g. the intermediate part MP is positioned in the user data region 10a. In the following, the "absolute value of the cross track interval" is sometimes simply referred to as a "cross track interval".

Figure 5:
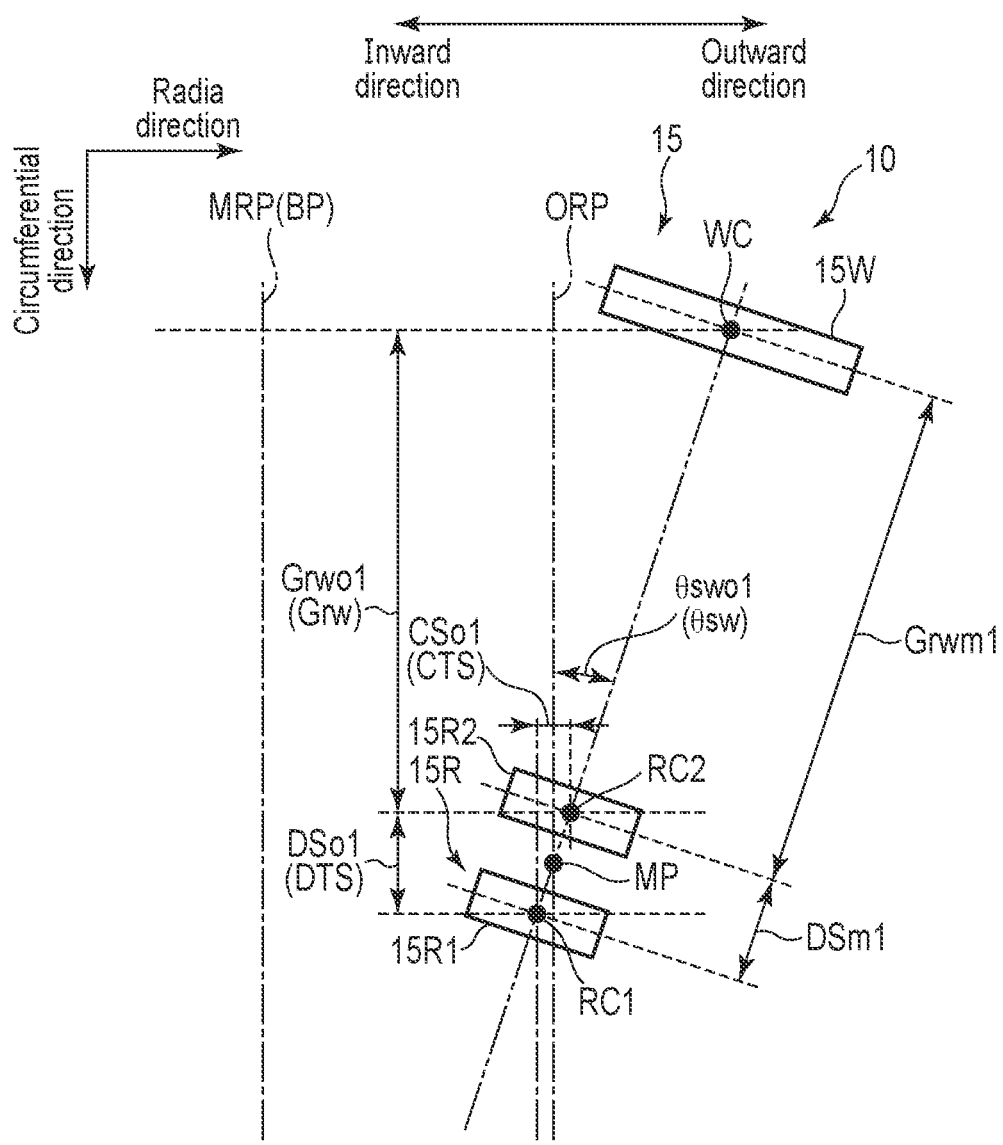
FIG. 5 is a diagram illustrating an example of the geometrical arrangement of a write head and two read heads in the case in which the intermediate part is positioned at a radial position.

FIG. 5 is a diagram illustrating an example of the geometric arrangement of the write head 15W and the two read heads 15R1 and 15R2 in the case in which the intermediate part MP is positioned at the radial position ORP.

In the example illustrated in FIG. 5, in the case in which the intermediate part MP is disposed at the radial position ORP, the write head 15W, the read head 15R1, the read head 15R2, and the intermediate part MP are inclined outward at a skew angle θsw=θswo1 to an axis extending in the circumferential direction. For example, the skew angle θswo1 is the same as the skew angle θswi1. Terms such as "the same", "identical", "match", and "equivalent" include not only the meaning of exactly the same but also the meaning of being different to an extent that can be regarded as being substantially the same. It should be noted that the skew angle θswo1 may be different from the skew angle θswi. The skew angle θswo1 may be larger than the skew angle θswi, for example. The skew angle θswo1 may be smaller than the skew angle θswi, for example. In the case in which the intermediate part MP is disposed at the radial position ORP, the read/write gap Grw is a distance θrwo1. In the case in which the intermediate part MP is disposed at the radial position ORP, the down track spacing (DTS) is the distance DSo1.

In the example illustrated in FIG. 5, in the case in which the intermediate part MP is disposed at the radial position ORP, the write head 15W, the read head 15R1, the read head 15R2, and the intermediate part MP are displaced in the radial direction. It should be noted that in the case in which the intermediate part MP is disposed at the radial position ORP, the write head 15W, the read head 15R1, the read head 15R2, and the intermediate part MP do not necessarily have to be displaced in the radial direction. In the case in which the intermediate part MP is disposed at the radial position ORP, the cross track interval (CTS) is a distance CSo1. The cross track interval CSo1 and the cross track interval CSi1 are the same. It should be noted that the cross track interval CSo1 and the cross track interval CSi1 may be different from each other. For example, the cross track interval CSo1 may be larger than the cross track interval CSi1. For example, the cross track interval CSo1 may be smaller than the cross track interval CSi1. The cross track interval CSo1 is the maximum value of the cross track interval in the case in which the head 15, e.g. the intermediate part MP is positioned in the user data region 10a. For example, in the case in which the cross track interval CSo1 and the cross track interval CSi1 are the same, the cross track interval CSo1 is the maximum value of the cross track interval. For example, in the case in which the cross track interval CSo1 is larger than the cross track interval Csi1, the cross track interval CSo1 is the maximum value of the cross track interval. It should be noted that the cross track interval CSo1 does not necessarily have to be the maximum value of the cross track interval in the case in which the head 15, e.g. the intermediate part MP is positioned in the user data region 10a. For example, in the case in which the cross track interval CSo1 is smaller than the cross track interval CSi1, the cross track interval CSo1 is not a maximum value.

The driver IC 20 controls driving of the SPM 12 and the VCM 14 according to control of the system controller 130 (specifically, an MPU 60, described later will be described).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 50, described later). The write driver outputs a write current corresponding to the write data output from the R/W channel 50 to the head 15.

The volatile memory 70 is a semiconductor memory in which stored data is lost when power supply is cut off. The volatile memory 70 stores data and the like necessary for processing in the units of the magnetic disk device 1. The volatile memory 70 is, e.g. a dynamic random access memory (DRAM) or a synchronous dynamic random access memory (SDRAM).

The nonvolatile memory 80 is a semiconductor memory that records stored data even though power supply is cut off. The nonvolatile memory 80 is, e.g. a NOR type or NAND type flash read only memory (FROM).

The buffer memory 90 is a semiconductor memory that temporarily records data and the like transmitted and received between the magnetic disk device 1 and the host 100. It should be noted that the buffer memory 90 may be configured integrally with the volatile memory 70. The buffer memory 90 is, e.g. a DRAM, a static random access memory (SRM), an SDRAM, a ferroelectric random access memory (FeRAM), a magnetoresistive random access memory (MRAM), or any other device.

The system controller (controller) 130 is realized using, e.g. a large-scale integrated circuit (LSI) called a system-on-a-chip (SoC) in which a plurality of elements is integrated on a single chip. The system controller 130 includes the hard disk controller (HDC) 40, the read/write (R/W) channel 50, the microprocessor (MPU) 60, and the like. The HDC 40, the R/W channel 50, and the MPU 60 are electrically connected to each other. The system controller 130 is electrically connected to, e.g. the driver IC 20, the head amplifier IC 30, the volatile memory 70, the nonvolatile memory 80, the buffer memory 90, the host system 100, and any other device.

The HDC 40 controls data transfer. The HDC 40 controls transfer of data between the host 100 and the disk 10, e.g. in response to an instruction from the MPU 60, described later. The HDC 40 is electrically connected to, e.g. the R/W channel 50, the MPU 60, the volatile memory 70, the nonvolatile memory 80, the buffer memory 90, and another device.

The R/W channel 50 executes signal processing of data transferred from the disk 10 to the host 100, e.g. read data and data transferred from the host 100, e.g. write data, according to an instruction from the MPU 60, described later. The R/W channel 50 has a circuit or a function of modulating write data. The R/W channel 50 has a circuit or a function of measuring signal quality of read data. The R/W channel 50 is electrically connected to, e.g. the head amplifier IC 30, the HDC 40, the MPU 60, and any other device.

The R/W channel 50 has a demodulation unit 510 and a demodulation unit 520. The demodulation unit 510 demodulates data read by the read head 15R1, e.g. servo data, and outputs the demodulated servo data to the MPU 60 and any other device. The demodulation unit 520 demodulates data read by the read head 15R2, e.g. servo data, and outputs the demodulated servo data to the MPU 60 and any other device. It should be noted that in the case in which three or more read heads 15R are provided in one head 15, the R/W channel 50 way have three or more demodulation units individually corresponding to the three or more read heads 15A provided in one head 15.

The MPU 60 is a main controller that controls the units of the magnetic disk device 1. The MPU 60 controls the VCM 14 through the driver IC 20 to execute servo control for positioning the head 15. The MPU 60 controls the SPM 12 through the driver IC 20 to rotate the disk 10. The MPU 60 controls a write operation of data to the disk 10 and selects a storage destination of data transferred from the host 100, e.g. write data. The MPU 60 controls the read operation of data from the disk 10, and controls the processing of data transferred from the disk 10 to the host 100, e.g. read data. The MPU 60 manages a region in which data is recorded. The MPU 60 is connected to the units of the magnetic disk device 1. The MPU 60 is electrically connected to, e.g. the driver IC 20, the HDC 40, the R/W channel 50, and any other component.

The MPU 60 has a read/write control unit 610 and a recording region management unit 620. The MPU 60 executes processing of the units, e.g. the read/write control unit 610, the recording region management unit 620, and any other device on firmware. It should be noted that the MPU 60 may have units, e.g. the read/write control unit 610, the recording region management unit 620, and any other device as a circuit.

The read/write control unit 610 controls a read process of reading data from the disk 10 and a write process of writing data to the disk 10 in response to a command or the like from the host 100. The read/write control unit 610 controls the VCM 14 through the driver IC 20, positions the head 15 at a particular position on the disk 10, and executes read processing or write processing.

For example, the read/write control unit 610 executes the write processing in a conventional magnetic recording (CMR) type in which data is written in a particular track or another track (in the following, sometimes referred to as an adjacent track) or another sector (in the following, sometimes referred to as an adjacent sector) adjacent to the particular track or the particular sector at a particular interval (gap) in the radial direction from the particular track or the particular sector. The "adjacent track" includes "a track adjacent to a particular track in the outward direction", "an adjacent track in the inward direction of a particular track", and "a plurality of tracks adjacent in an outward direction and an inward direction of a particular track". The "adjacent sector" includes "a sector adjacent to a particular sector in the outward direction", "an adjacent sector in the inner direction of a particular sector", and "a plurality of sectors adjacent to a particular sector in the outward direction and the inward direction". In the following, "to write data in the normal recording mode" is sometimes referred to as "to perform normal recording", "to perform normal recording processing", or simply "to write".

In sequentially writing a plurality of tracks, the read/write control unit 610 executes the write processing in a shingled write (Shingled write magnetic recording: SMR, or Shingled Write Recording: SWR) mode in which a track to be written next is overwritten in a part of the radial direction of the track written one before. In the following, "to write data in shingled recording mode" is sometimes referred to as "to shingled-record", "to perform shingled recording processing", or sometimes simply referred to as "to write".

The read/write control unit 610 executes normal recording processing or shingled recording processing in accordance with a command or the like from the host 100. In other words, the read/write control unit 610 selectively executes the normal recording processing and the shingled recording processing in response to a command or the like from the host 100. It should be noted that the read/write control unit 610 may execute the normal recording processing alone or may execute the shingled recording processing alone. The write processing that is not the shingled recording processing is sometimes referred to as normal recording processing.

Figure 6:
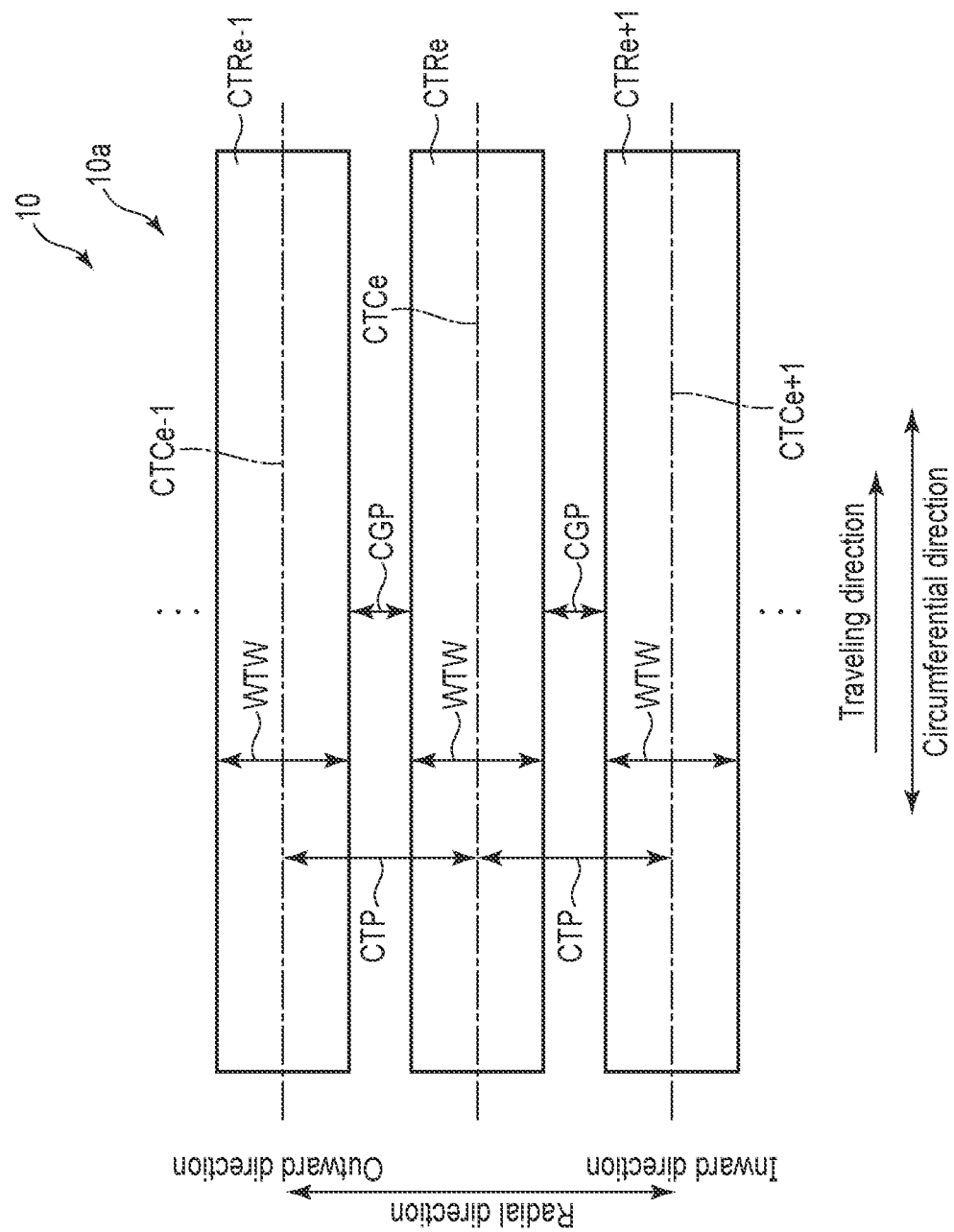
FIG. 6 is a schematic diagram illustrating an example of normal recording processing.

FIG. G is a schematic diagram illustrating an example of normal recording processing. FIG. 6 illustrates a traveling direction. A direction in which the head 15 sequentially writes data to and reads data from the disk 10 in the circumferential direction, i.e., a direction in which the head 15 travels toward the disk 10 in the circumferential direction is sometimes referred to as the traveling direction. For example, the traveling direction is opposite to the rotation direction of the disk 10. It should be noted that the traveling direction may be the same direction as the rotation direction of the disk 10. FIG. E illustrates tracks CTRe−1, CTRe, and CTRe+1. The tracks CTRe−1, CTRe, and CTRe+1 are continuously arranged in the inward direction in the order described. The track CTRe is adjacent to the track CTRe−1 in the inward direction. The track CTRe+1 is adjacent to the track CTRe in the inward direction. In FIG. 6, track widths WTW of the tracks CTRe−1, CTRe, and CTRe+1 are the same. It should be noted that the track widths of the tracks CTRe−1, CTRe, and CTRe+1 may be different from each other. FIG. 6 illustrates a track center CTCe−1 of the track CTRe−1, a track center CTCe of the track CTRe, and a track center CTCe+1 of the track CTRe+1. For example, a plurality of normally recorded tracks is disposed at the same track pitch. It should be noted that the plurality of normally recorded tracks may be disposed at different track pitches. In FIG. 6, the tracks CTRe−1, CTRe, and CTRe−1 are disposed at a track pitch CTP. It should be noted that the tracks CTRe−1, CTRe, and CTRe+1 may be disposed at different track pitches. The tracks CTRe−1 and CTRe are separated at a gap CGP in the radial direction. The tracks CTRe and CTRe+1 are separated at a gap CGP in the radial direction. That is, the gap CGP between the tracks CTRe−1 and CTRe and the gap CGP between the tracks CTRe and CTRe+1 are the same. It should be noted that the gap between the tracks CTRe−1 and CTRe and the gap between the tracks CTRe and CTRe+1 may be different from each other. In FIG. 6, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction.

In the example illustrated in FIG. 6, the read/write control unit 610 positions the head 15 at the track center CTCe in a particular region of the disk 10, e.g. the user data region 10a, and normally records the track CTRe−1 or a particular sector of the track CTRe−1. The read/write control unit 610 positions the head 15 at the track center CTCe separated inward from the track center CTCe−1 of the track CTRe−1 at the track pitch CTP in the user data region 10a, and normally records the track CTRe or a particular sector of the track CTRe. The read/write control unit 610 positions the head 15 at the track center CTCe+1 separated inward from the track center CTCe of the track CTRe by the track pitch CTP in the user data region 10a, and normally records the particular sector of the track CTRe+1 or the track CTRe+1.

In the example illustrated in FIG. 6, the read/write control unit 610 may normally record the tracks CTRe−1, CTRe, and CTRe+1 sequentially in the inward direction in the order described in a particular region of the disk 10, e.g. the user data region 10a, or may normally record the tracks CTRe−1, CTRe, and CTRe+1 randomly in a particular sector of the track CTRe−1, a particular sector of the track CTRe, and a particular sector of the track CTRe+1.

In the example illustrated in FIG. 6, the read/write control unit 610 positions the head 15 at the track center CTCe−1 and reads the track CTRe−1. The read/write control unit 610 positions the head 15 at the track center CTCe and reads the track CTRe. The read/write control unit 610 positions the head 15 at the track center CTCe+1 and reads the track CTRe+1.

Figure 7:
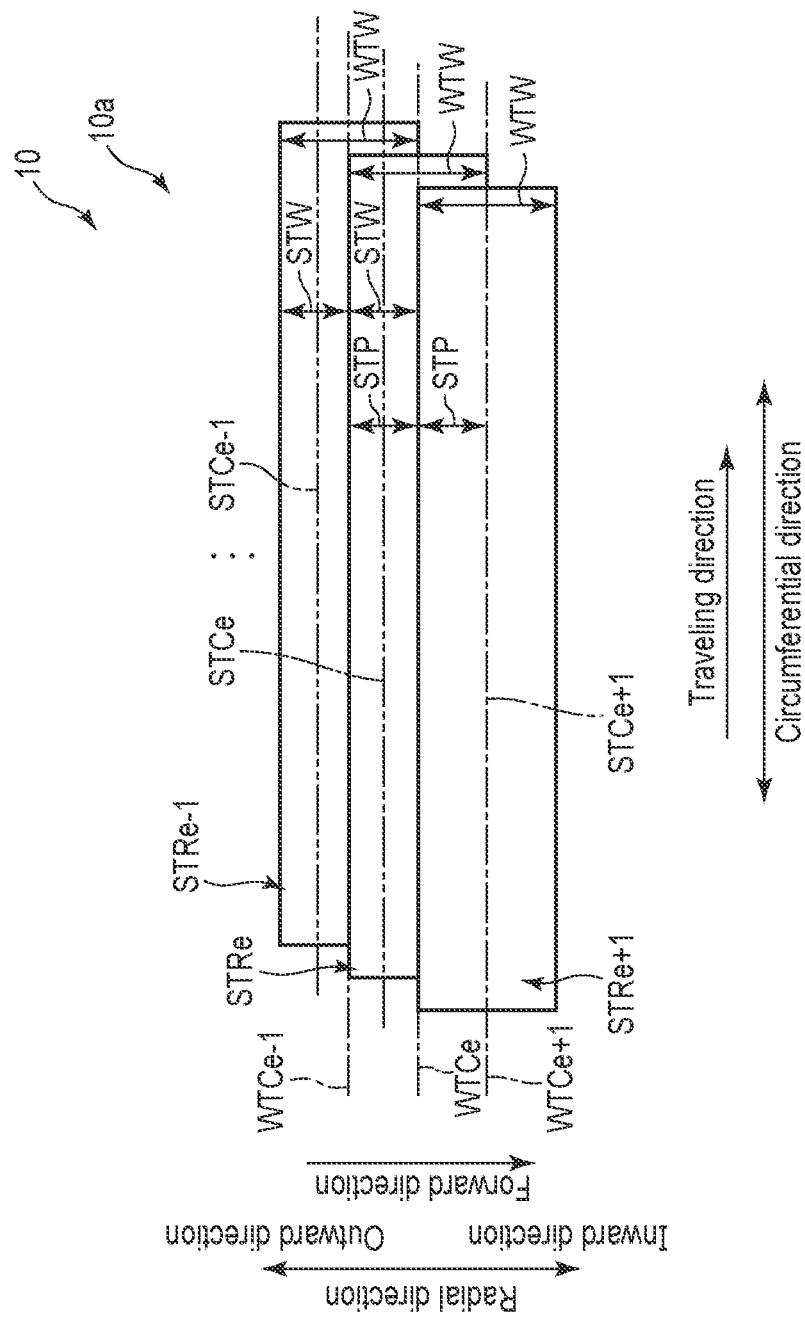
FIG. 7 is a schematic diagram illustrating an example of shingled recording processing.

FIG. 7 is a schematic diagram illustrating an example of shingled recording processing. FIG. 7 illustrates a forward direction. A direction in which a plurality of tracks is continuously shingle-recorded in the radial direction, i.e., a direction in which a track to be written next is overlapped with a track written one ahead in the radial direction is sometimes referred to as a forward direction. In FIG. 7, although the inward direction in the radial direction is the forward direction, the outward direction in the radial direction may be the forward direction. FIG. 7 illustrates tracks STRe−1, STRe, and STRe+1. The tracks STRe−1, STRe, and STRe+1 are continuously overwritten in one direction in the radial direction. The tracks STRe−1, STRe, and STRe+1 are continuously disposed in the inward direction in the order described. The track STRe is overwritten in the inward direction of the track STRe−1. The track STRe+1 is overwritten in the inward direction of the track STRe. No other track is overwritten on the track STRe+1. The track STRe+1 corresponds to, e.g. a track on which overwriting is performed last in a plurality of tracks on which shingled recording is performed by one command or the like. In FIG. 7, track width WTW of the track STRe−1 before the track STRe is overwritten, the track width WTW of the track STRe before the track STRe+1 is overwritten, and the track width WTW of the track STRe+1 are the same. It should be noted that the track width of the track STRe−1 before the track STRe is overwritten, the track width of the track STRe before the track STRe+1 is overwritten, and the track width of the track STRe+1 may be different from each other. In the following, the "width of a particular track before another track is overwritten" is sometimes simply referred to as a "particular track width". FIG. 7 illustrates a center position WTCe−1 in the radial direction of the track width WTW of the track STRe−1 before the track STRe is overwritten, a center position WTCe in the radial direction of the track width WTW of the track STRe before the track STRe+1 is overwritten, and a center position (track center) WTCe+1 in the radial direction of the track width WTW of the track STRe+1. For example, the plurality of shingled recorded tracks is disposed at the same track pitch. It should be noted that the tracks STRe−1, STRe, and STRe+1 may be disposed at different track pitches. In FIG. 7, the tracks STRe−1, STRe, and STRe+1 are disposed at a track pitch STP. It should be noted that the tracks STRe−1, STRe, and STRe+1 may be disposed at different track pitches. The track width STW of the track STRe−1 after the track STRe is overwritten is the same as the track width STW of the track STRe after the track STRe+1 is overwritten. It should be noted that the track width STW of the track STRe−1 after the track STRe is overwritten and the track width STW of the track STRe after the track STRe+1 is overwritten may be different from each other. The track width STW is smaller than the track width WTW. In the following, the "width of a particular track after another track is overwritten" is sometimes referred to as a "particular track width". FIG. 7 illustrates a center position (track center) STCe−1 in the radial direction of the track width STW of the track STRe−1 after the track STRe is overwritten, a center position (track center) STCe of the track width STW of the track STRe when the track STRe+1 is overwritten, and a center position (track center) STCe+1 in the radial direction of the track width WTW of the track STRe+1. The track center STCe+1 and the track center WTCe+1 are the same. In FIG. 7, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction. It should be noted that in FIG. 7, although three tracks are overwritten, less than three tracks or more than three tracks may be overwritten.

In the example illustrated in FIG. 7, the read/write control unit 610 positions the head 15 at the center position WTCe−1 of the track STRe−1 and writes the track STRe−1 in a particular region of the disk 10, e.g. the user data region 10a. The read/write control unit 610 positions the head 15 at a center position WTCe separated inward from the center position WTCe−1 of the track STRe−1 at the track pitch STP in the user data region 10a, and performs shingled recording (overwriting) of the track STRe on the track STRe−1. The read/write control unit 610 positions the head 15 at a center position WTCe+1 separated inward from the center position WTCe of the track STRe by a track pitch STP in the user data region 10a, and performs shingled recording (overwriting) of the track STRe+1 on the track STRe.

In the example illustrated in FIG. 7, the read/write control unit 610 sequentially records the tracks STRe−1, STRe, and STRe+1 in the order described in the inward direction in a particular region of the disk 10, e.g. the user data region 10a.

In the example illustrated in FIG. 7, the read/write control unit 610 positions the head 15 at the track center STCe−1 and reads the track STRe−1. The read/write control unit 610 positions the head 15 at the track center STCe and reads the track STRe. The read/write control unit 610 positions the head 15 at the track center STCe+1 (WTCe+1) and reads the track STRe+1.

Figure 8:
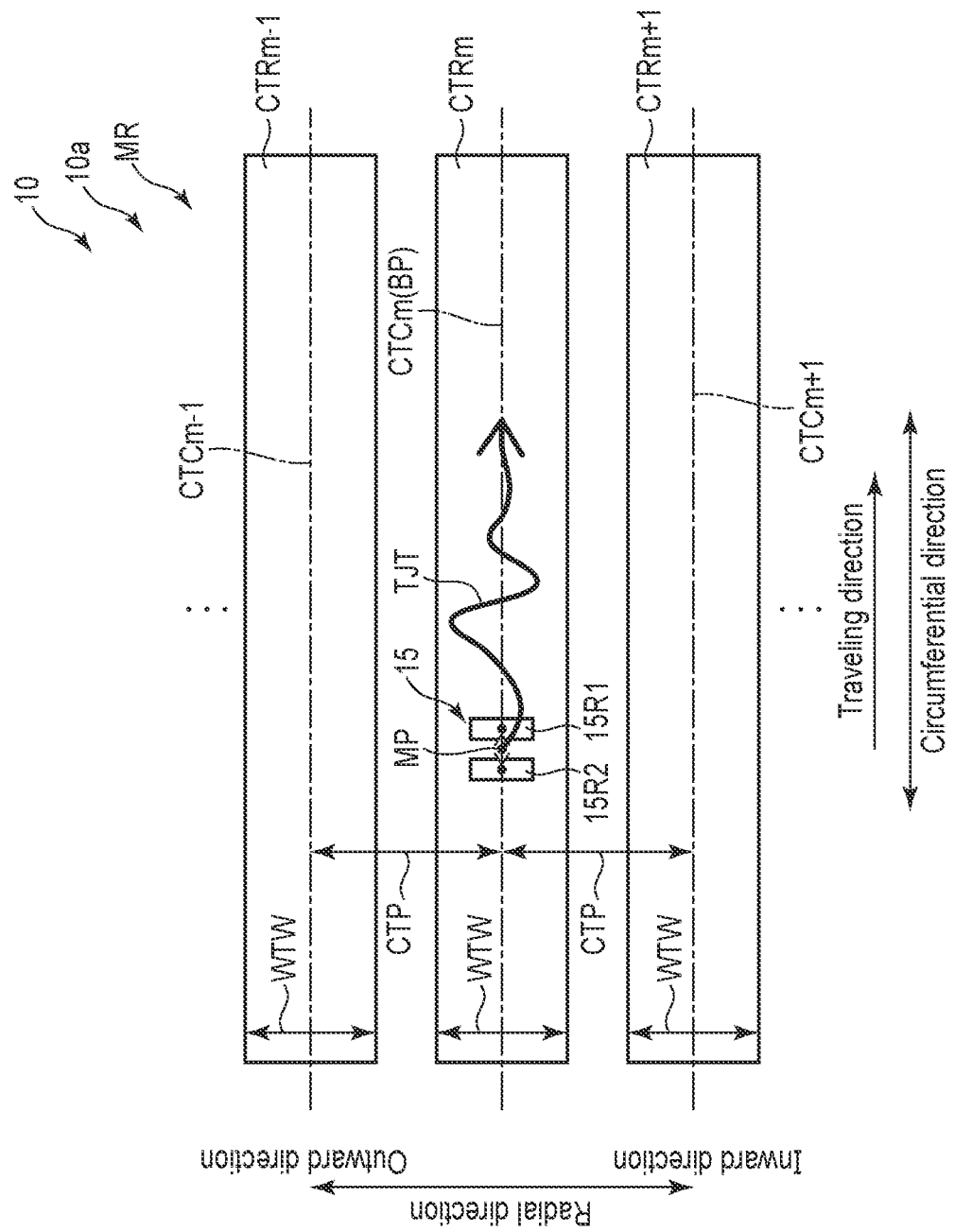
Figure 9:
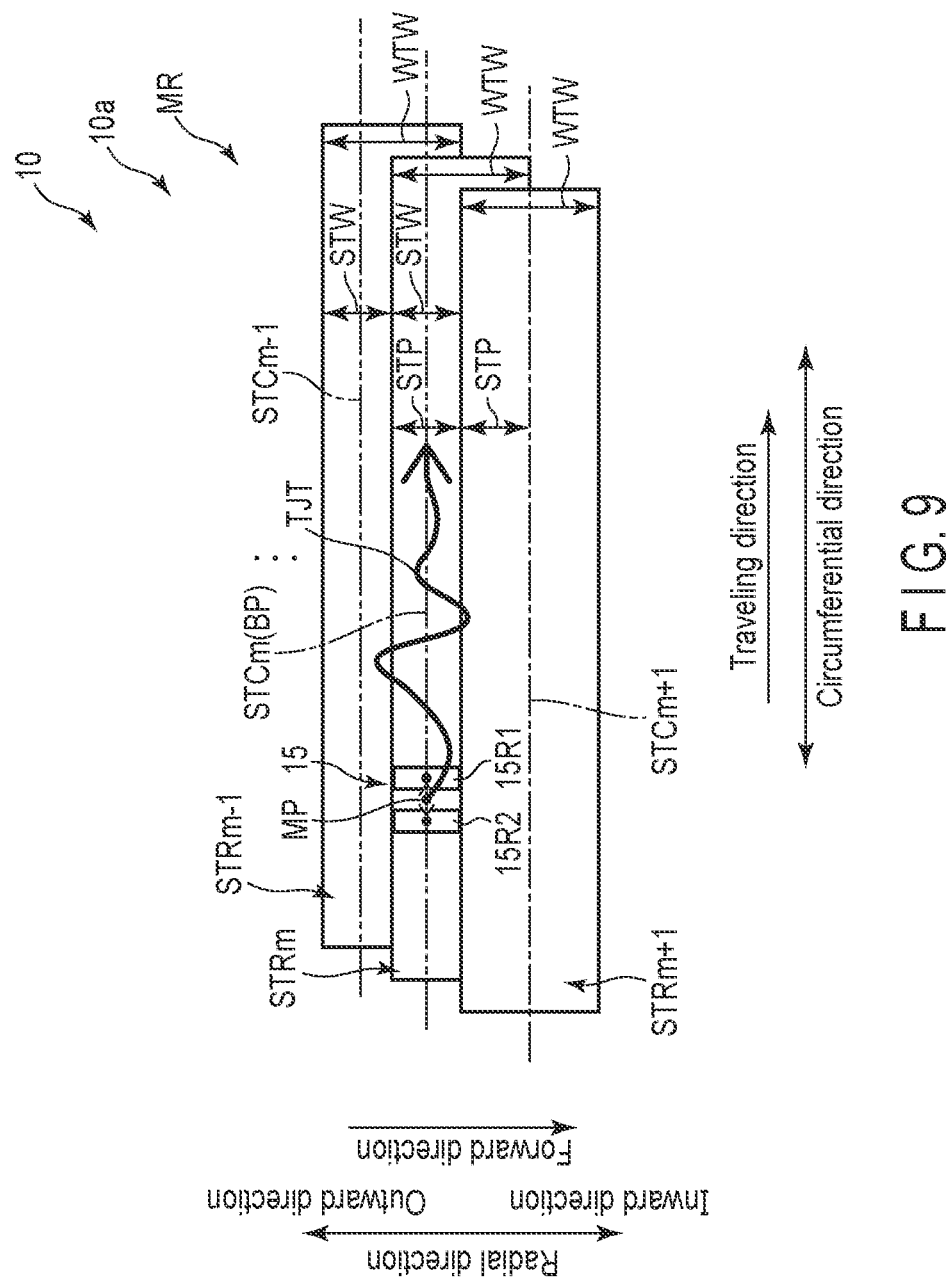
FIG. 9 is a schematic diagram illustrating an example of read processing of data shingle-recorded in the middle circumferential region.

FIG. 8 is a schematic diagram illustrating an example of read processing of data normally recorded in the middle circumferential region MR. FIG. 8 corresponds to FIG. 6. FIG. 8 illustrates tracks CTRm−1, CTRm, and CTRm+1. The tracks CTRm−1, CTRm, and CTRm+1 are normally recorded continuously in the inward direction in the order described in the middle circumferential region MR. The track CTRm is adjacent in the inward direction of the track CTRm−1 in the middle circumferential region MR. The track CTRm+1 is adjacent in the inward direction of the track CTRm in the middle circumferential region MR. In FIG. 8, track widths WTW of the tracks CTRm−1, CTRm, and CTRm+1 are the same. It should be noted that the track widths of the tracks CTRm−1, CTRm, and CTRm+1 may be different from each other. FIG. 8 illustrates a track center CTCm−1 of the track CTRm−1, a track center CTCm of the track CTRm, and a track center CTCm+1 of the track CTRm+1. For example, the track center CTCm corresponds to the reference position BP. In FIG. 8, the tracks CTRm−1, CTRm, and CTRm−1 are disposed at a track pitch CTP. It should be noted that the tracks CTRm−1, CTRm, and CTRm+1 may be disposed at different track pitches. In FIG. 8, the read head 15R, e.g. the intermediate part MP is positioned at the track center CTCm of the track CTRm. In the case in which the intermediate part MP is positioned at the track center CTCm, the cross track interval between the read heads 15R1 and 15R2 takes a minimum value, e.g. zero. FIG. 8 illustrates a trajectory (or path) TJT of the read head 15R, e.g. the intermediate part MP in the case in which the read head 15R is positioned at a particular radial position and reads data in the magnetic disk device 1 placed on a server rack under an environment of vibrations externally generated from a fan for air cooling, for example. In FIG. 9, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction.

In the example illustrated in FIG. 8, the read/write control unit 610 positions the read head 15R, e.g. the intermediate part MP at the track center CTCm and reads the track CTRm. At the read/write control unit 610, the read head 15R vibrates due to the influence of external vibration or the like, and reads the track CTRm while the intermediate part MP is displaced (or offset) from the track center CTCm in the radial direction following the trajectory TJT. At the read/write control unit 610, the read heads 15R1 and 15R2 having the minimum value of the cross track interval, e.g. 0, read the track CTRm while the read heads 15R1 and 15R2 area shifted in the radial direction to the track center CTCm. In other words, at the read/write control unit 610, the read heads 15R1 and 15R2 read the track CTRm while the read heads 15R1 and 15R2 are radially offset from the track center CTCm in a state in which the read heads 15R1 and 15R2 are not displaced from each other in the radial direction. The read/write control unit 610 can read the track CTRm without simultaneously shifting the read heads 15R1 and 15R2 to the adjacent tracks CTRm−1 and CTRm+1.

FIG. 9 is a schematic diagram illustrating an example of read processing of data shingle-recorded in the middle circumferential region MR. FIG. 9 corresponds to FIG. 7. FIG. 9 illustrates tracks STRm−1, STRm, and STRm+1. The tracks STPm−1, STRm, and STRm+1 are continuously shingle-recorded in the forward direction in the order described in the middle circumferential region MR. The track STRm is overwritten in the forward direction (inward direction) of the track STRm−1 in the middle circumferential region MR. The track STRm+1 is overwritten in the forward direction (inward direction) of the track STRm in the middle circumferential region MR. No other track is overwritten on the track STRm+1. The track STRm+1 corresponds to, e.g. a track written last in a plurality of tracks shingle-recorded by one command or the like. In FIG. 9, the track width WTW of the track STRm−1 before the track STRm is overwritten, the track width WTW of the track STRm before the track STRm+1 is overwritten, and the track width WTW of the track STRm+1 are the same. It should be noted that the track width WTW of the track STRm−1 before the track STRm is overwritten, the track width WTW of the track STRm before the track STRm+1 is overwritten, and the track width WTW of the track STRm+1 may be different from each other. In FIG. 9, the tracks STRm−1, STRm, and STRm+1 are disposed at a track pitch STP. It should be noted that the tracks STRm−1, STRm, and STRm+1 may be disposed at different track pitches. The track width STW of the track STRm−1 after the track STRm is overwritten is the same as the track width STW of the track STRm after the track STRm+1 is overwritten. It should be noted that the track width STW of the track STRm−1 after the track STRM is overwritten may be different from the track width STW of the track STRm after the track STRm+1 is overwritten. FIG. 9 illustrates a center position (track center) STCm−1 in the radial direction of the track width STW of the track STRm−1 after the track STRm is overwritten, a center position (track center) STCm of the track width STW of the track STRm after the track STRm+1 is overwritten, and a center position (track center) STCm+1 in the radial direction of the track width WTW of the track STRm+1. For example, the track center STCm corresponds to the reference position BP. In FIG. 9, the read head 15R, e.g. the intermediate part MP is positioned at the track center STCm of the track STRm. In the case in which the intermediate part MP is positioned at the track center STCm, the cross track interval between the read heads 15R1 and 15R2 takes a minimum value, e.g. zero. FIG. 9 illustrates the trajectory TJT of the read head 15R, e.g. the intermediate part MP in the case in which the read head 15R is positioned at a particular radial position and reads data in the magnetic disk device 1 placed under the vibration environment. In FIG. 9, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction. It should be noted that in FIG. 9, although three tracks are overwritten, less than three tracks or more than three tracks may be overwritten.

In the example illustrated in FIG. 9, the read/write control unit 610 positions the read head 15R, e.g. the intermediate part MP at the track center STCm and reads the track STRm. At the read/write control unit 610, the read head 15R vibrates due to the influence of external vibration or the like, and reads the track STRm while the intermediate part MP is displaced (or offset) in the radial direction to the track center STCm following the trajectory TJT. The read/write control unit 610 reads the track STRm using the read heads 15R1 and 15R2 while the read heads 15R1 and 15R2 are displaced in the radial direction to the track center STCm in which the cross track interval is the minimum value, e.g. zero. In other words, in a state in which the read heads 15R and 15R2 are not displaced in the radial direction from each other, the read/write control unit 610 reads the track STRm while the read heads 15R1 and 15R2 are displaced in the radial direction to the track center STCm. In the read/write control unit 610, the read heads 15R1 and 15R2 can be simultaneously displaced to the adjacent tracks STRm−1 and STRm+1. in the case in which the read heads 15R1 and 15R2 are simultaneously displaced to the adjacent tracks STRm−1 and STRm+1, the read/write control unit 610 may fail to read the track STRm.

Figure 10:
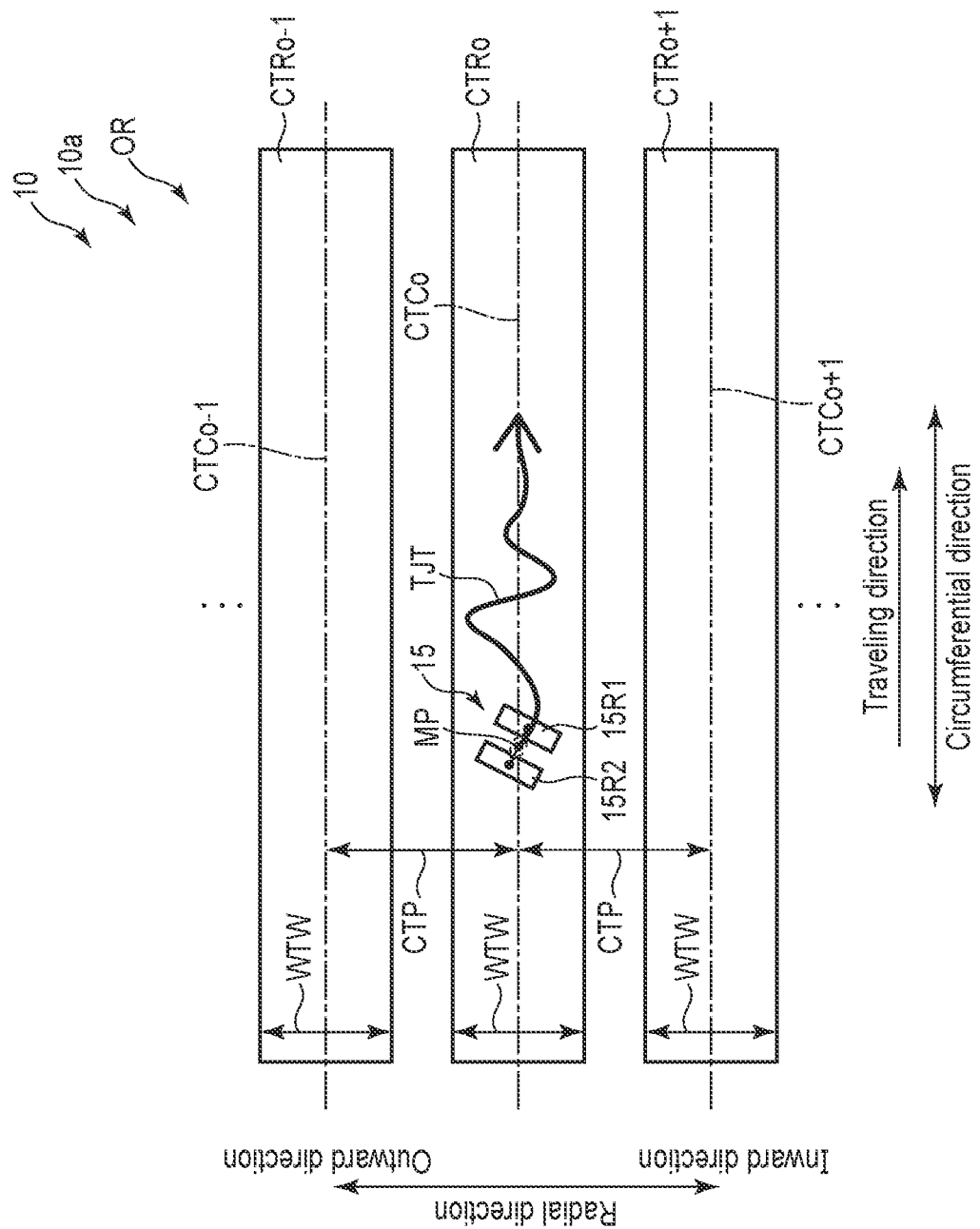
FIG. 10 is a schematic diagram illustrating an example of read processing of data normally recorded in an outer circumferential region.

FIG. 10 is a schematic diagram illustrating an example of read processing of data normally recorded in the outer circumferential region OR. FIG. 10 corresponds to FIG. 6. The outer circumferential region OR in FIG. 10 is disposed outward from the middle circumferential region MR in FIGS. 8 and 9. FIG. 10 illustrates tracks CTRo−1, CTRo, and CTRo+1. The tracks CTRo−1, CTRo, and CTRo+1 are normally recorded continuously in the inward direction in the order described in the outer circumferential region OR. The track CTRo is adjacent to the track CTRo−1 in the inward direction in the outer circumferential region OR. The track CTRo+1 is adjacent in the inward direction of the track CTRo in the outer circumferential region CP. In FIG. 10, the track widths WTW of the tracks CTRo−1, CTRo, and CTRo+1 are the same. It should be noted that the track widths of the tracks CTRo−1, CTRo, and CTRo+1 may be different from each other. FIG. 10 illustrates a track center CTCo−1 of the track CTRo−1, a track center CTCo of the track CTRo, and a track center CTCo+1 of the track CTRo+1. In FIG. 1), the tracks CTRo−1, CTRo, and CTRo−1 are disposed at a track pitch CTP. It should be noted that the tracks CTRo−1, CTRo, and CTRo+1 may be disposed at different track pitches. In FIG. 10, the read head 15R, e.g. the intermediate part MP is positioned at the track center CTCo of the track CTRo. In the case in which the intermediate part MP is positioned at the track center CTCo, the cross track interval between the read heads 15R1 and 15R2 takes a value larger than the minimum value. That is, in the case in which the intermediate part MP is positioned at the track center CTCo, the read head 15R is inclined outward from the track center CTCo. FIG. 10 illustrates the trajectory TJT of the read head 15R, e.g. the intermediate part MP in the case in which the magnetic disk device 1 placed under the vibration environment is positioned at a particular radial position and read. In FIG. 10, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction.

In the example illustrated in FIG. 10, the read/write control unit 610 positions the read head 15R, e.g. the intermediate part MP at the track center CTCo and reads the track CTRo. At the read/write control unit 610, the read head 15R vibrates due to the influence of external vibration or the like, and reads the track CTRo while the intermediate part MP is displaced (or offset) from the track center CTCo in the radial direction following the trajectory TJT. The read/write control unit 610 reads the track CTRo using the read heads 15R1 and 15R2 while the read heads 15R1 and 15R2 are radially offset from the track center CTCo in which the cross track interval is a value larger than the minimum value. In other words, in a state in which the read head 15R is displaced outward from the track center CTCo and the read heads 15R1 and 15R2 are displaced in the radial direction from each other, the read/write control unit 610 reads the track CTRo while the read heads 15R1 and 15R2 are offset in the radial direction from the track center CTCo. The read/write control unit 610 can read the track CTRo without simultaneously shifting the read heads 15R1 and 15R2 to the adjacent tracks CTRo−1 and CTRo+1.

FIG. 11 is a schematic diagram illustrating an example of read processing of data shingle-recorded in the outer circumferential region OR. FIG. 11 corresponds to FIG. 7. The outer circumferential region OR in FIG. 11 is disposed outward from the middle circumferential region MR in FIGS. 8 and 9. FIG. 11 illustrates tracks STRo−1, STRo, and STRo+1. The tracks STRo−1, STRo, and STRo−1 are continuously shingle-recorded in the forward direction in the order described in the outer circumferential region OR. The track STRo is overwritten in the forward direction (inward direction) of the track STRo−1 in the outer circumferential region CR. The track STRo+1 is overwritten in the forward direction (inward direction) of the track STRo in the outer circumferential region OR. No other track is overwritten on the track STRo+1. The track STRo+1 corresponds to, e.g. a track written last in a plurality of tracks shingle-recorded by one command or the like. In FIG. 11, the track width WTW of the track STRo−1 before the track STRo is overwritten, the track width WTW of the track STRo before the track STRo+1 is overwritten, and the track width WTW or the track STRo+1 are the same. It should be noted that the track width WTW of the track STRo−1 before the track STRo is overwritten, the track width WTW of the track STRo before the track STRo+1 is overwritten, and the track width WTW of the track STRo+1 may be different from each other. In FIG. 11, the tracks STRo−1, STRo, and STRo+1 are disposed at a track pitch STP. It should be noted that the tracks STRo−1, STRo, and STRo+1 may be disposed at different track pitches. The track width STW of the track STRo−1 after the track STRo is overwritten is the same as the track width STW of the track STRo after the track STRo+1 is overwritten. It should be noted that the track width STW of the track STRo−1 after the track STRo is overwritten and the track width STW of the track STRo after the track STRo+1 is overwritten may be different from each other. FIG. 11 illustrates a center position (track center) STCo−1 in the radial direction of the track width STW of the track STRo−1 after the track STRo is overwritten, a center position (track center) STCo of the track width STW of the track STRo after the track STRo+1 is overwritten, and a center position (track center) STCo+1 in the radial direction of the track width WTW of the track STRo+1. In FIG. 11, the read head 15R, e.g. the intermediate part MP is positioned at the track center STCo of the track STRo. In the case in which the intermediate part MP is positioned at the track center STCo, the cross track interval between the read heads 15R1 and 15R2 takes a value larger than the minimum value. That is, in the case in which the intermediate part MP is positioned at the track center STCo, the read head 15R is inclined outward from the track center STCo. FIG. 11 illustrates the trajectory TJT of the read head 15R, e.g. the intermediate part MP in the case in which the read head 15R is positioned at a particular radial position and reads data in the magnetic disk device 1 placed under the vibration environment. In FIG. 11, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction. It should be noted that in FIG. 11, although three tracks are overwritten, less than three tracks or more than three tracks may be overwritten.

In the example illustrated in FIG. 11, the read/write control unit 610 positions the read head 15R, e.g. the intermediate part MP at the track center STCo and reads the track STRo. At the read/write control unit 610, the read head 15R vibrates due to the influence of external vibration or the like, and reads the track STRo while the intermediate part MP is displaced (or offset) in the radial direction to the track center STCo following the trajectory TJT. The read/write control unit 610 reads the track STRo using the read heads 15R1 and 15R2 while the read heads 15R1 and 15R2 are radially offset from the track center STCo in which the cross track interval is a value larger than the minimum value. In other words, in a state in which the read head 15R is displaced outward from the track center STCo and the read heads 15R1 and 15R2 are displaced in the radial direction from each other, the read/write control unit 610 reads the track STRo while the read heads 15R1 and 15R2 are offset in the radial direction from the track center STCo. The read/write control unit 610 can read the track STRo using at least one of the read heads 15R1 and 15R2.

Figure 12:
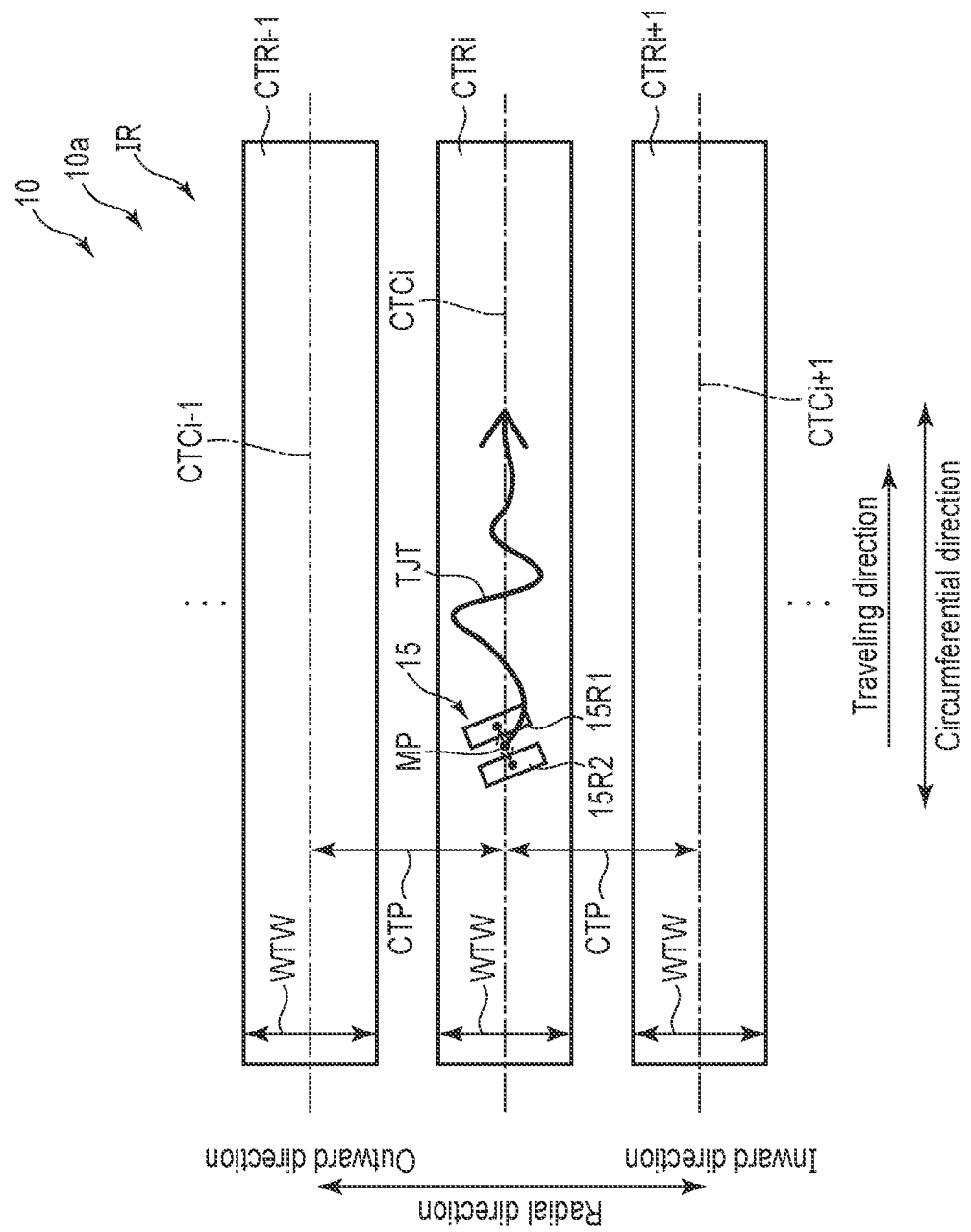
FIG. 12 is a schematic diagram illustrating an example of read processing of data normally recorded in an inner circumferential region.

FIG. 12 is a schematic diagram illustrating an example of read processing of data normally recorded in the inner circumferential region IR. FIG. 12 corresponds to FIG. 6. The inner circumferential region IR in FIG. 12 is disposed in the inner direction of the middle circumferential region MR in FIGS. 6 and 9. FIG. 12 illustrates tracks CTRi−1, CTRi, and CTRi+1. The tracks CTRi−1, CTRi, and CTRi+1 are normally recorded continuously in the inward direction in the order described in the inner circumferential region IR. The track CTRi is adjacent to the track CTRi−1 in the inward direction in the inner circumferential region IR. The track CTRi+1 is adjacent in the inward direction of the track CTRi in the inner circumferential region IR. In FIG. 12, the track widths WTW of the tracks CTRi−1, CTRi, and CTRi+1 are the save. It should be noted that the track widths of the tracks CTRi−1, CTRi, and CTRi+1 may be different from each other. FIG. 12 illustrates a track center CTCi−1 of the track CTRi−1, a track center CTCi of the track CTRi, and a track center CTCi+1 of the track CTRi+1. In FIG. 12, the tracks CTRi−1, CTRi, and CTRi−1 are disposed at a track pitch CTP. It should be noted that the tracks CTRi−1, CTRi, and CTRi+1 may be disposed at different track pitches. In FIG. 12, the read head 15R, e.g. the intermediate part MP is positioned at the track center CTCi of the track CTRi. In the case in which the intermediate part MP is positioned at the track center CTCi, the cross track interval between the read heads 15R1 and 15R2 takes a value larger than the minimum value. That is, in the case in which the intermediate part MP is positioned at the track center CTCi, the read head 15R is inclined outward from the track center CTCi. FIG. 12 illustrates the trajectory TJT of the read head 15R, e.g. the intermediate part MP in the case in which the read head 15R is positioned at a particular radial position and reads data in the magnetic disk device 1 placed under the vibration environment. In FIG. 12, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction.

In the example illustrated in FIG. 12, the read/write control unit 610 positions the read head 15R, e.g. the intermediate part MP at the track center CTCi and reads the track CTRi. At the read/write control unit 610, the read head 15R vibrates due to the influence of external vibration or the like, and reads the track CTRi while the intermediate part MP is displaced (or offset) from the track center CTCi in the radial direction following the trajectory TJT. The read/write control unit 610 reads the track CTRi using the read heads 15R1 and 15R2 while the read heads 15R1 and 15R2 are radially offset from the track center CTC in which the cross track interval is a value larger than the minimum value. In other words, in a state in which the read head 15R is displaced in the inward direction to the track center CTCi and the read heads 15R1 and 15R2 are displaced in the radial direction from each other, the read/write control unit 610 reads the track CTRi while the read heads 15R1 and 15R2 are offset in the radial direction from the track center CTCi. The read/write control unit 610 can read the track CTRi without simultaneously shifting the read heads 15R1 and 15R2 to the adjacent tracks CTRi−1 and CTRi+1.

FIG. 13 is a schematic diagram illustrating an example of read processing of data shingle-recorded in the inner circumferential region IR. FIG. 13 corresponds to FIG. 7. The inner circumferential region IR in FIG. 13 is disposed outward from the middle circumferential region MR in FIGS. 8 and 9. FIG. 13 illustrates tracks STRi−1, STRi, and STRi+1. The tracks STRi−1, STRi, and STRi+1 are continuously shingle-recorded in the forward direction in the order described in the inner circumferential region IR. The track STRi is overwritten in the forward direction (inward direction) of the track STRi−1 in the inner circumferential region IR. The track STRi+1 is overwritten in the forward direction (inward direction) of the track STRi in the inner circumferential region IR. No other track is overwritten on the track STRi+1. The track STRi+1 corresponds to, e.g. a track written last in a plurality of cracks shingle-recorded by one command or the like. In FIG. 13, the track width WTW of the track STRoi−1 before the track STRi is overwritten, the track width WTW of the track STRi before the track STRi+1 is overwritten, and the track width WTW of the track STRoi+1 are the same. It should be noted that the track width of the track STRi−1 before the track STRi is overwritten, the track width of the track STRi before the track STRi+1 is overwritten, and the track width of the track STRi+1 may be different from each other. In FIG. 13, tracks STRi−1, STRi, and STRi+1 are disposed at a track pitch STP. It should be noted that the tracks STRi−1, STRi, and STRi+1 may be disposed at different track pitches. The track width STW of the track STRi−1 after the track STRi is overwritten is the same as the track width STW of the track STRi after the track STRi+1 is overwritten. It should be noted that the track width STW of the track STRi−1 after the track STRi is overwritten and the track width STW of the track STRi after the track STRi+1 is overwritten may be different from each other. PTG. 13 illustrates a center position (track center) STCi−1 in the radial direction of the track width STW of the track STRi−1 after the track STRo is overwritten, a center position (track center) STCi of the track width STW of the track STRi after the track STRi+1 is overwritten, and a center position (track center) STCi+1 in the radial direction of the track width WTW of the track STRi+1. In FIG. 13, the read head 15R, e.g. the intermediate part MP is positioned at the track center STCi of the track STRi. In the case in which the intermediate part MP is positioned at the track center STCi, the cross track interval between the read heads 15R1 and 15R2 takes a value larger than the minimum value. That is, in the case in which the intermediate part MP is positioned at the track center STCi, the read head 15R is inclined inward from the track center STCI. FIG. 13 illustrates the trajectory TJT of the read head 15R, e.g. the intermediate part MP in the case in which the read head 15R is positioned at a particular radial position and reads data in the magnetic disk device 1 placed under the vibration environment. In FIG. 13, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction. It should be noted that in FIG. 13, although three tracks are overwritten, less than three tracks or more than three tracks may be overwritten.

In the example illustrated in FIG. 13, the read/write control unit 610 positions the read head 15R, e.g. the intermediate part MP at the track center STCi and reads the track STRi. At the read/write control unit 610, the read head 15R vibrates due to the influence of external vibration or the like, and reads the track STRi while the intermediate part MP is displaced (or offset) in the radial direction to the track center STCi following the trajectory TJT. The read/write control unit 610 reads the track STRi using the read heads 15R1 and 15R2 while the read heads 15R1 and 15R2 are offset from the track center STCi in the radial direction in which the cross track interval is a value larger than the minimum value. In other words, in a state in which the read head 15R is displaced inward to the track center STCi and the read heads 15R1 and 15R2 are displaced from each other in the radial direction, the read/write control unit 610 reads the track STRi while the read heads 15R1 and 15R2 are offset from the track center STCi in the radial direction. The read/write control unit 610 can read the track STRi using at least one of the read heads 15R1 and 15R2.

Figure 14:
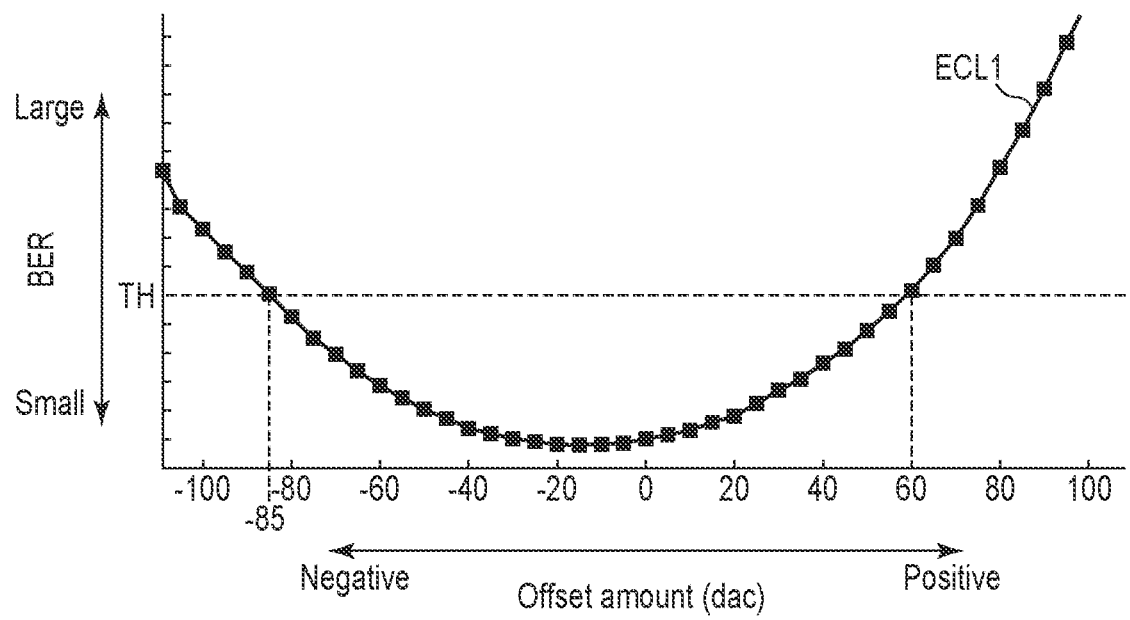
FIG. 14 is a schematic diagram illustrating an example of a change in a bit error rate to an offset amount of two read heads in the case in which a particular track is read using the two read heads in which a cross track interval is a value larger than a minimum value.

FIG. 14 is a schematic diagram illustrating an example of a change ECL1 in the bit error rate to the offset amount of the read heads 15R1 and 15R2 in the case in which a particular track is read using the two read heads 15R1 and 15R2 in which the cross track interval is a value larger than the minimum value. In FIG. 14, the horizontal axis expresses the DAC value (in the following, simply referred to as an offset amount or a displaced amount) corresponding to the distance (in the following, sometimes referred to as an offset amount or a displaced amount) radially offset from the track center of the particular track of the read heads 15R1 and 15R2 (and the intermediate part MP). On the horizontal axis of FIG. 14, the offset amount has a positive value increasing toward the tip end side of the positive arrow and a negative value decreasing toward the tip end side of the negative arrow. On the horizontal axis of FIG. 14, the offset amount=0 dac (origin) corresponds to the track center of a particular track. The vertical axis expresses an error rate, e.g. a bit error rate (BER). On the vertical axis of FIG. 14, the bit error rate increases toward the tip end side of the large arrow and decreases toward the tip end side of the negative arrow. The vertical axis in FIG. 14 expresses a threshold TH at which a particular track can be read using the read heads 15R1 and 15R2. For example, in the case in which the bit error rate is larger than the threshold TH, there is a possibility that the read heads 15R1 and 15R2 fail to normally read, and in the case in which the bit error rate is equal to or less than the threshold TH, the read heads 15R1 and 15R2 can normally read. FIG. 14 illustrates a change (in the following, simply referred to as a change in the bit error rate) ECL1 in the bit error rate to the offset amount. In FIG. 14, the change ECL1 in the bit error rate is the threshold TH in the case in which the offset amount=−85 dac, and is the threshold TH in the case in which the offset amount=60 dac.

In the example illustrated in FIG. 14, as illustrated in FIGS. 10 to 13, the read/write control unit 610 positions the intermediate part MP at the track center of a particular track in the outer circumferential region OR or the inner circumferential region IR, and reads this track using the two read heads 15R1 and 15R2 in which the cross track interval is a value larger than the minimum value. In the case in which the read head 15R, e.g. the intermediate part MP is offset in the range (in the following, sometimes referred to as an offset margin)=145 dac from the negative offset amount=−85 dac to the positive offset amount=60 dac, the read/write control unit 610 can normally read this track.

Figure 15:
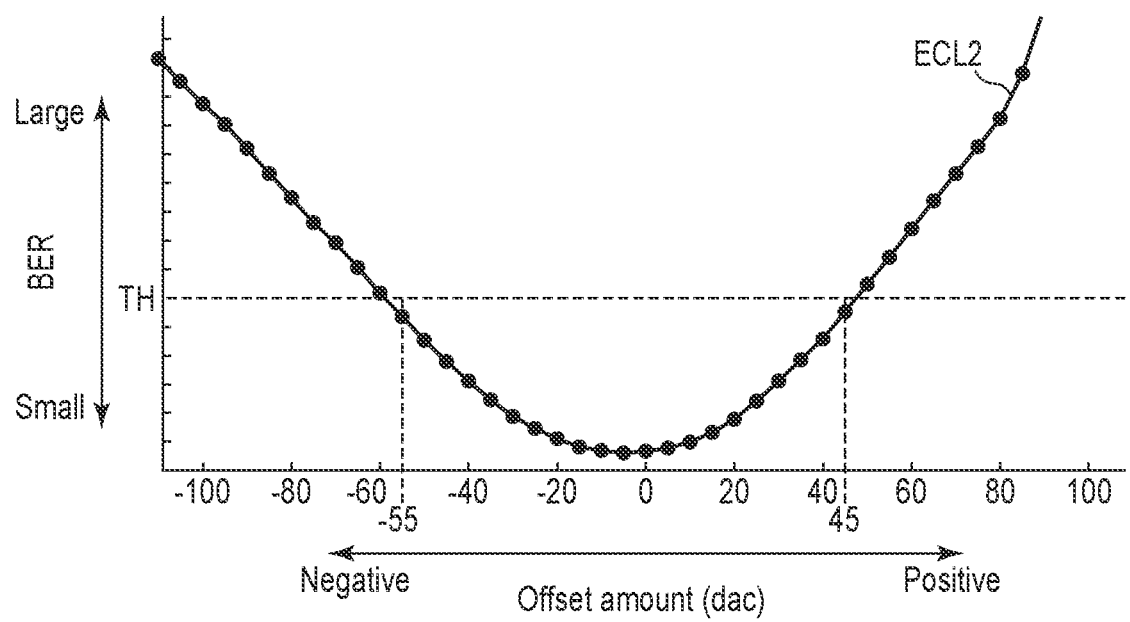
FIG. 15 is a schematic diagram illustrating an example of a change in a bit error rate to an offset amount of two read heads in the case in which a particular track is read using the two read heads having a minimum cross track interval.

FIG. 15 is a schematic diagram illustrating an example of a change ECL2 in the bit error rate to the offset amount of the read heads 15R1 and 15R2 in the case in which a particular track is read using the two read heads 15R1 and 15R2 in which the cross track interval is the minimum value. In FIG. 15, the horizontal axis expresses the offset amount of the read heads 15R1 and 15R2 (and the intermediate part MP). On the horizontal axis of FIG. 15, the offset amount has a positive value increasing toward the tip end side of the positive arrow and a negative value decreasing toward the tip end side of the negative arrow. On the horizontal axis of FIG. 15, the offset amount=0 dac (origin) corresponds to the track center of a particular track. The vertical axis expresses an error rate, e.g. a bit error rate (BER). On the vertical axis of FIG. 15, the bit error rate increases toward the tip end side of the large arrow and decreases toward the tip end side of the negative arrow. The vertical axis in FIG. 15 expresses the threshold TH. FIG. 15 illustrates a change ECL2 in the bit error rate. In FIG. 15, the change ECL2 in the bit error rate is the threshold TH in the case in which the offset amount=−55 dac, and is the threshold TH in the case in which the offset amount=45 dac.

In the example illustrated in FIG. 15, as illustrated in FIGS. 8 and 9, the read/write control unit 610 positions the intermediate part MP at the track center of a particular track of the middle circumferential region MR and reads this track using the two read heads 15R1 and 15R2 having the minimum value of the cross track interval. In the case in which the read head 15R, e.g. the intermediate part MP is offset with the offset margin=100 dac from the negative offset amount=−55 dac to the positive offset amount=45 dac, the read/write control unit 610 can normally read this track.

The offset margin (=145 dac) of the read heads 15R1 and 15R2 in the case in which a particular track is read using the two read heads 15R1 and 15R2 having the cross track interval of a value larger than the minimum value illustrated in FIG. 14 is larger than the offset margin (=100 dac) of the read heads 15R1 and 15R2 in the case in which a particular track is read using the two read heads 15R1 and 15R2 having the cross track interval of the minimum value illustrated in FIG. 15. Therefore, data is shingle-recorded in a region that can be read using the two read heads 15R1 and 15R2 in which the cross track interval is a value larger than the minimum value, and data is written by normal recording in a region that can be read using the two read heads 15R1 and 15R2 in which the cross track interval is the minimum value, and thus the degradation in the read performance can be suppressed even in the case in which the read head 15R vibrates due to the influence of external vibration or any other cause.

Figure 16:
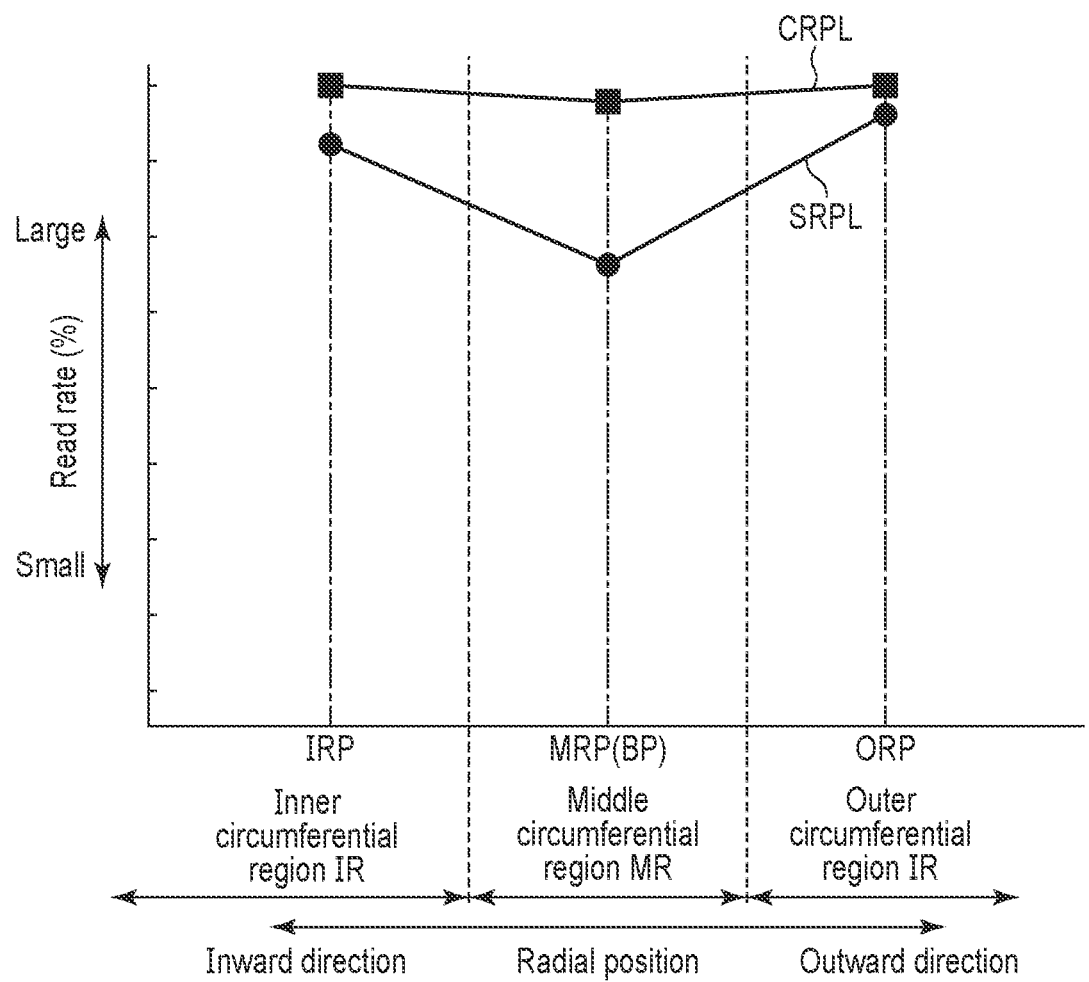
FIG. 16 is a schematic diagram illustrating an example of a change in a read rate to a radial position.

FIG. 16 is a schematic diagram illustrating an example of a change in a read rate to a radial position. FIG. 16 corresponds to FIGS. 2 to 5. In FIG. 16, the horizontal axis expresses the radial position, and the vertical axis expresses the possibility (in the following, simply referred to as a read rate or read performance) (%) that data can be read using the plurality of read heads 15R, e.g. the read heads 15R1 and 15R2. The read rate corresponds to, e.g. a rate at which data can be normally read using the plurality of read heads 15R, e.g. the read heads 15R1 and 15R2 in a state in which there is the influence of external vibration or the like to a rate at which data can be normally read using the plurality of read heads 15R, e.g. the read heads 15R1 and 15R2 in a state in which there is no influence of external vibration or the like. On the horizontal axis of FIG. 16, the radial position is located in the outward direction toward the tip end side of the outward arrow, and is located in the inward direction toward the tip end side of the inward arrow. On the horizontal axis of FIG. 16, the radial position is divided into the inner circumferential region IR, the middle circumferential region MR, and the outer circumferential region OR. On the vertical axis of FIG. 16, the read rate increases toward the tip end side of the large arrow and decreases toward the tip end side of the small arrow. FIG. 16 illustrates a change (in the following, simply referred to as a change in the read rate of the normal recording data) CRPL of the read rate of the plurality of read heads 15R, e.g. the read heads 15R1 and 15R2 to the radial position when data normally recorded at each radial position is read using the plurality of read heads 15R, e.g. the read heads 15R1 and 15R2. FIG. 16 illustrates a change (in the following, simply referred to as a change in the read rate of the shingle-recorded data) SRPL of the read rate of the plurality of read heads 15R, e.g. the read heads 15R1 and 15R2 to the radial position in the case in which the data shingle-recorded at each radial position is read using the plurality of read heads 15R, e.g. the read heads 15R1 and 15R2.

In the example illustrated in FIG. 16, the change CRPL in the read rate of the normal recording data is substantially unchanged in the inner circumferential region IR, the middle circumferential region MR, and the outer circumferential region OR. The change SRPL in the read rate of the shingle-recorded data is smaller in the middle circumferential region MR than in the inner circumferential region IR and the outer circumferential region OR. The read change of the shingle-recorded data is smaller than the change CRPL of the read rate of the normal recording data.

From the example illustrated in FIG. 16, in order to achieve a high track per inch (TPI), data is written by shingled recording in at least one of the inner circumferential region IR and the outer circumferential region OR of the disk 10, and data is written by normal recording in the middle circumferential region MR, so that it is possible to achieve a high TPI without deteriorating read performance.

The recording region management unit 620 manages a radial region of the disk 10 according to an instruction from the host 100 and any other device. In response to an instruction from the host 100 and any other device, the recording region management unit 620 sets or changes a radial region (in the following, sometimes referred to as a normal recording region) in which data is normally recorded and a radial region (in the following, sometimes referred to as a shingled recording region) in which data is shingle-recorded in the disk 10, e.g. the user data region 10a. The recording region management unit 620 may record information regarding the radial region of the disk 10, e.g. the normal recording region and the shingled recording region set in the user data region 10a in a particular recording region, e.g. the user data region 10a, the media cache 10b, the system region 10c, the volatile memory 70, the nonvolatile memory 80, or the like.

The recording region management unit 620 manages the normal recording region for each radial region (In the following, sometimes referred to as a normal recording band region) that can normally record up to a radial region of a specific size (or a specific region) or a specific data capacity. The normal recording band region can include a plurality of tracks that is normally recorded. For example, the recording region management unit 620 sets a normal recording region for each normal recording band region in the disk 10. For example, the recording region management unit 620 changes the normal recording region to the shingled recording region for each normal recording band region. It should be noted that the recording region management unit 620 does not necessarily have to set the normal recording region for each normal recording band region, and may set a radial region of an arbitrary size or region of the disk 10 as the normal recording region according to an instruction from the host 100 and any other device.

The recording region management unit 620 preferentially sets or changes a radial region (in the following, sometimes referred to as a minimum cross track interval region) including a radial position (reference position) BP of the disk 10 in which the cross track interval taxes a minimum value in the case in which the head 15 is positioned, e.g. the user data region 10a to the normal recording region. The recording region management unit 62C preferentially sets or changes the minimum cross track interval region including the radial position (reference position) BP of the user data region 10a in which the read heads 15R1 and 15R2 are not displaced in the radial direction (or are arranged in the circumferential direction) in the case in which the head 15, e.g. the intermediate part MP is positioned to the normal recording region. In one example, the recording region management unit 620 preferentially sets or changes the minimum cross track interval region including the radial position (reference position) BP of the user data region 10a at which the skew angle takes the minimum value in the case in which the head 15, e.g. the intermediate part MP is positioned to the normal recording region. For example, the recording region management unit 620 preferentially sets the normal recording region in the middle circumferential region MR. For example, the recording region management unit 620 preferentially sets or changes the minimum cross track interval region including the radial position (reference position) BP of the disk 10 in which the minimum value of the cross track interval takes 10 nm (nanometer) or less in the case in which the head 15 is positioned, e.g. the user data region 10a to the normal recording region. It should be noted that the recording region management unit 620 may set the user data region 10c other than the minimum cross track interval region as the normal recording region.

The recording region management unit 620 manages the shingled recording region for each radial region (in the following, sometimes referred to as a shingled recording band region) in which shingled recording can be performed up to a radial region of a specific size (or a specific region) or a specific data capacity. The shingled recording band region may include a plurality of tracks on which shingled recording is performed. For example, the recording region management unit 620 sets the shingled recording region for each shingled recording band region in the disk 10. For example, the recording region management unit 620 changes the shingled recording region to the normal recording region for each shingled recording band region. It should be noted that the recording region management unit 62C does not necessarily have to set the normal recording region for each shingled recording band region, and may set a radial region of an arbitrary size or region of the disk 10 as the shingled recording region according to an instruction from the host 100 and any other device.

The recording region management unit 620 preferentially sets or changes the disk 10 in which the cross track interval takes the maximum value in the case in which the head 15 is positioned, e.g. the radial region (in the following, sometimes referred to as a maximum cross track interval region) including the radial position in the following, sometimes referred to as a maximum position) IRP and/or ORP of the user data region 10a as the shingled recording region. The recording region management unit 620 preferentially sets or changes the maximum cross track interval region including the radial position (maximum position) IRP and/or ORP of the user data region 10a where the read heads 15R1 and 15R2 are most separated in the radial direction in the case in which the head 15, e.g. the intermediate part MP is positioned as the shingled recording region. In one example, the recording region management unit 62C preferentially sets or changes the maximum cross track interval region including the radial position (maximum position) IRP and/or ORP of the user data region 10a in which the skew angle takes the maximum value in the case in which the head 15, e.g. the intermediate part MP is positioned as the shingled recording region. For example, the recording region management unit 620 sets the shingled recording region in the inner circumferential region IR and/or the outer circumferential region OR. For example, the recording region management unit 620 preferentially sets or changes the disk 10 in which the maximum value of the cross track interval takes 15 nm (nanometer) or more in the case in which the head 15 is positioned, e.g. the maximum cross track interval region including the radial position (maximum position) IRP and/or ORP of the user data region 10a as the shingled recording region.

Figure 17:
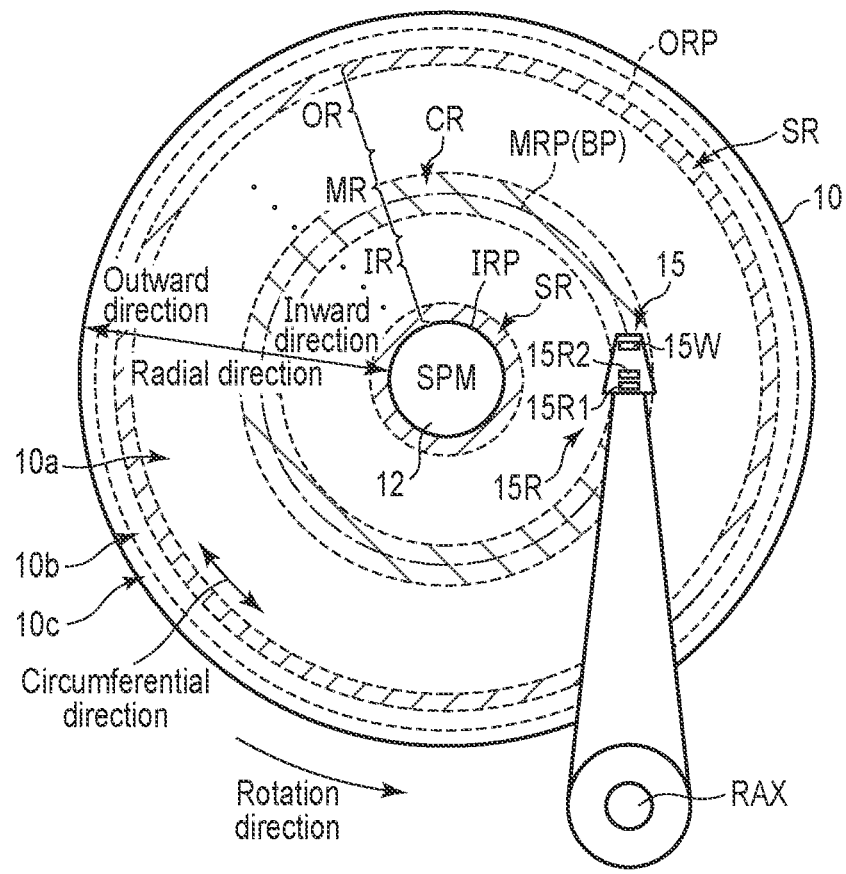
FIG. 17 is a schematic diagram illustrating an example of the arrangement of a normal recording region and a shingled recording region according to the embodiment.

For example, the maximum value of the cross track interval of two read heads 15R in the plurality of read heads 15P in the maximum cross track interval region (e.g. the shingled recording region) is larger than the minimum value of the cross track interval of two read heads 15R in the plurality of read heads 15R in the minimum cross track interval region (e.g. the normal recording region). In other words, for example, the minimum value of the cross track intervals of the two read heads 15R in the plurality of read heads 15H in the minimum cross track interval region (e.g. the normal recording region) is smaller than the maximum value of the cross track intervals of the two read heads 15R in the plurality of read heads 15R in the maximum cross track interval region (e.g. the shingled recording region). It should be noted that the recording region management unit 620 may set the user data region 10a other than the maximum cross track interval region as the shingled recording region. FIG. 17 is a schematic diagram illustrating an example of the arrangement of the normal recording region CR and the shingled recording region SR according to the present embodiment.

In the example illustrated in FIG. 17, the recording region management unit 620 preferentially sets the minimum cross track interval region including the radial position MRP (reference position EP) to the normal recording region CR, and normally records data in the normal recording region CR. In FIG. 17, the normal recording region (minimum cross track interval region) CR is indicated by oblique lines rising to the left. The recording region management unit 620 preferentially sets the maximum cross track interval region including the radial position (maximum position) IRP as the shingled recording region SR, and shingle-records data in the shingled recording region SR including the radial position IRP. The recording region management unit 620 preferentially sets the maximum cross track interval region including the radial position (maximum position) ORP as the shingled recording region SR, and shingle-records data in the shingled recording region SR including the radial position ORP. In FIG. 17, the shingled recording region (maximum cross track interval region) SR is indicated by oblique lines rising to the right. It should be noted that the recording region management unit 620 sets the user data region 10a between the normal recording region CR and the shingled recording region SR as at least one of the normal recording region CR and the shingled recording region SR, normally records data in the normal recording region CR, and shingle-records data in the shingled recording region SR.

Figure 18:
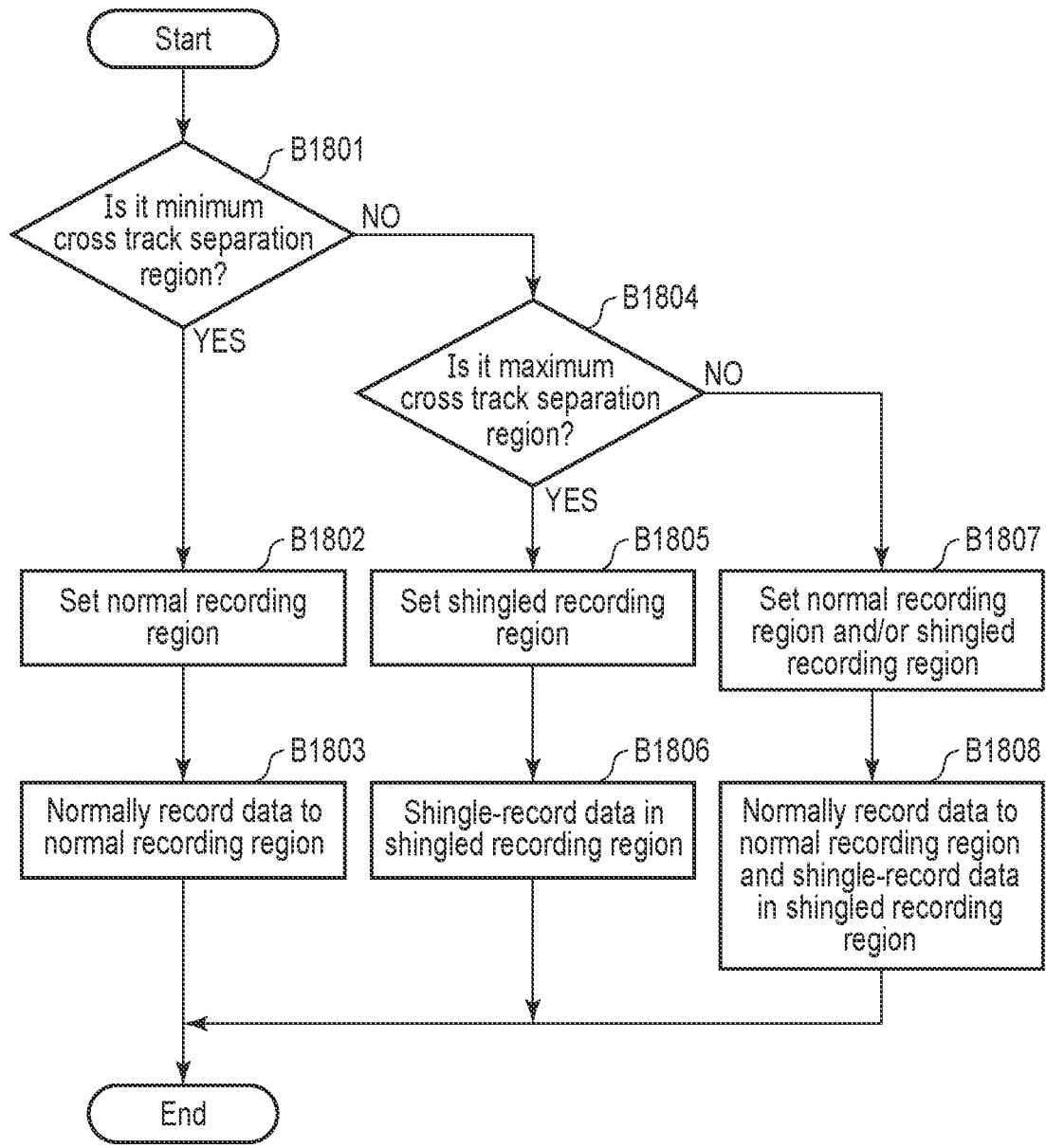
FIG. 18 is a flowchart illustrating an example of a write processing method according to an embodiment.

FIG. 18 is a flowchart illustrating an example of a write processing method according to the present embodiment.

The MPU 60 determines whether the particular radial region of the user data region 10a is the minimum track interval region or the minimum cross track interval region (B1801). In the case in which it is determined that the particular radial region is the minimum cross track interval region (YES in B1801), the MPU 60 preferentially sets the radial region as the normal recording region CR (B1802), normally records the data in the normal recording region CR (B1803), and ends the process.

In the case in which it is determined that the particular radial region is not the minimum cross track interval region (NO in B1801), the MPU 60 determines whether the particular radial region of the user data region 10a is the maximum cross track interval region (B1804). In the case in which it is determined that the particular radial region is the maximum cross track interval region (YES in B1804), the MPU 60 preferentially sets this radial region as the shingled recording region SR (B1805), and shingle-records data in the shingled recording region SP. (B1806).

In the case in which it is determined that the particular radial region is not the maximum cross track interval region (NO in B1804), the MPU 60 sets the particular radial region of the user data region 10a to the normal recording region CR and/or the shingled recording region SR (B1807), normally records data in the normal recording region CR, and records data in the shingled recording region SR (B1808). For example, in the case in which it is determined that the particular radial region is not the maximum cross track interval region, the MPU 60 may normally record data in this radial region or may shingled record data in this radial region. For example, in the case in which it is determined that the particular radial region is not the maximum cross track interval region, the MPU 60 may normally record data in a part of the radial region and shingled record the data in a region other than the part of the radial region.

According to the present embodiment, the magnetic disk device 1 has the write head 15W and the head 15 having the plurality of read heads 15R (15R1 and 15R2). The magnetic disk device 1 preferentially sets the minimum cross track interval region in the normal recording region CR, and normally records data in the minimum cross track interval region. The magnetic disk device 1 preferentially sets the maximum cross track interval region to the shingled recording region SR, and shingle-records data in the maximum cross track interval region. Even in the case in which the head 15 fluctuates to the track center of a particular track due to the influence of external vibration or the like, the magnetic disk device 1 can normally read this track using any read head 15R of the plurality of read heads 15R. Accordingly, the magnetic disk device 1 can suppress the degradation in the read performance.

Next, a magnetic disk device according to modifications will be described. In the modification, the same parts as those in the above-described embodiment are designated with the same reference signs, and the detailed description is omitted.

(First Modification)

A magnetic disk device 1 according to the first modification is different from the magnetic disk device 1 according to the above-described embodiment in the configuration of the head 15.

The read head 15R includes a plurality of read heads, e.g. three read heads 15R1, 15R2, and 15R3. The read head 15R1 is provided, e.g. at a position the farthest from the write head 15W. The read head 15R2 is provided, e.g. at a position next to the read head 15R1 from the write head 15W. The read head 15R3 is provided, e.g. at a position next to the read head 15R2 away from the write head 15W. The read head 15R2 is located between the read head 15R1 and the read head 15R3, and the read head 15R3 is located between the write head 15W and the read head 15R2. It should be noted that the read head 15R may have four or more read heads. In the following, the plurality of read heads, e.g. the three read heads 15R1, 15R2, and 15R3 may be collectively referred to as a read head 15R, or any one of the plurality of read heads, e.g. the read heads 15R1, 15R2, and 15R3 may be simply referred to as a read head 15R.

Figure 19:
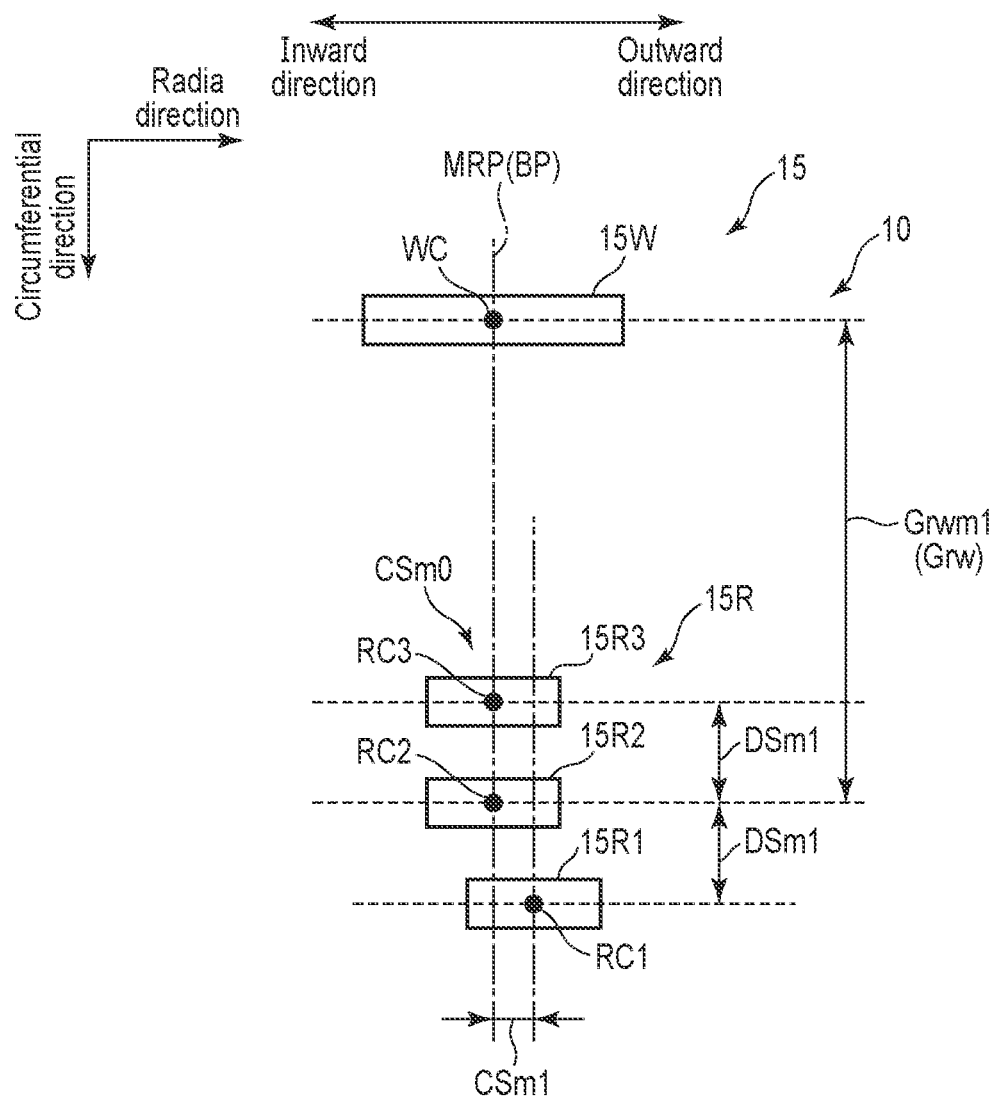
FIG. 19 is a schematic diagram illustrating an example of the geometric arrangement of a write head and three read heads in the case in which the read heads according to a first modification is positioned at a radial position.

FIG. 19 is a schematic diagram illustrating an example of the geometric arrangement of a write head 15W and three read heads 15R1, 15R2, and 15R3 in the case in which the read head 15R2 according to the first modification is positioned at the radial position MRP. FIG. 19 illustrates a center part WC of the write head 15W, a center part RC1 of the read head 15R1, a center part RC2 of the read head 15R2, and a center part RC3 of the read head 15R3. In the example illustrated in FIG. 19, the read head 15R2 is disposed or positioned at a target position to write/read data. It should be noted that data may be written/read by disposing or positioning the read head 15R other than the read head 15R2 in the plurality of read heads 15R at the target position. In addition, data may be written/read by disposing or positioning an intermediate part between two read heads 15R in the plurality of read heads 15R at a target position.

In the example illustrated in FIG. 19, in the case in which the read head 15R2 is disposed at the radial position MRP (reference position BP), the write head 15W, the read head 15R2, and the read head 15R3 are arranged along the circumferential direction. The write head 15W, the read head 15R2, the read head 15R3, and the read head 15R1 are not arranged along the circumferential direction. In the case in which the read head 15R2 is disposed at the radial position MRP (reference position BP), the down track interval (DTS) between the read heads 15R2 and 15R3 is the distance DSm1. That is, the down track interval between the read heads 15R2 and 15R3 and the down track interval between the read heads 15R1 and 15R2 are the same.

In the example illustrated in FIG. 19, in the case in which the read head 15R2 is disposed at the radial position MRP (reference position BP), the write head 15W, the read head 15R2, and the read head 15R3 are not displaced in the radial direction. In other words, the write head 15W, the read head 15R2, and the read head 15R3 are located at the radial position MRP (reference position BP). It should be noted that in the case in which the read head 15R2 is disposed at the radial position MRP (reference position BP), the write head 15W, the read head 15R2, and the read head 15R3 may be displaced in the radial direction. In the case in which the read head 15R2 is disposed at the radial position MRP (reference position BP), the write head 15W, the read head 15R2, and the read head 15R3 are displaced from the read head 15R1 in the radial direction. It should be noted that in the case in which the read head 15R2 is disposed at the radial position MRP (reference position BP), the write head 15W, the read head 15R2, the read head 15R3, and the read head 15R1 do not necessarily have to be displaced in the radial direction. In FIG. 19, the skew angle θsw of the head 15 is 0°. In the case in which the read head 15R2 is disposed at the radial position MRP (reference position BP), the cross track interval (CTS) between the read heads 15R1 and 15R2 is a distance CSm1. In the case in which the read head 15R2 is disposed at the radial position MRP (reference position BP), the cross track interval (CTS) between the read heads 15R2 and 15R3 is a minimum value, e.g. the distance CSm0=0. The cross track interval (CTS) between the read heads 15R1 and 15R3 is a distance CSm1. Tt should be noted that in the case in which the read head 15R2 is disposed at the radial position MRP (reference position BP), the write head 15W, the read head 15R1, the read head 15R2, and the read head 15R3 may be displaced in the radial direction.

Figure 20:
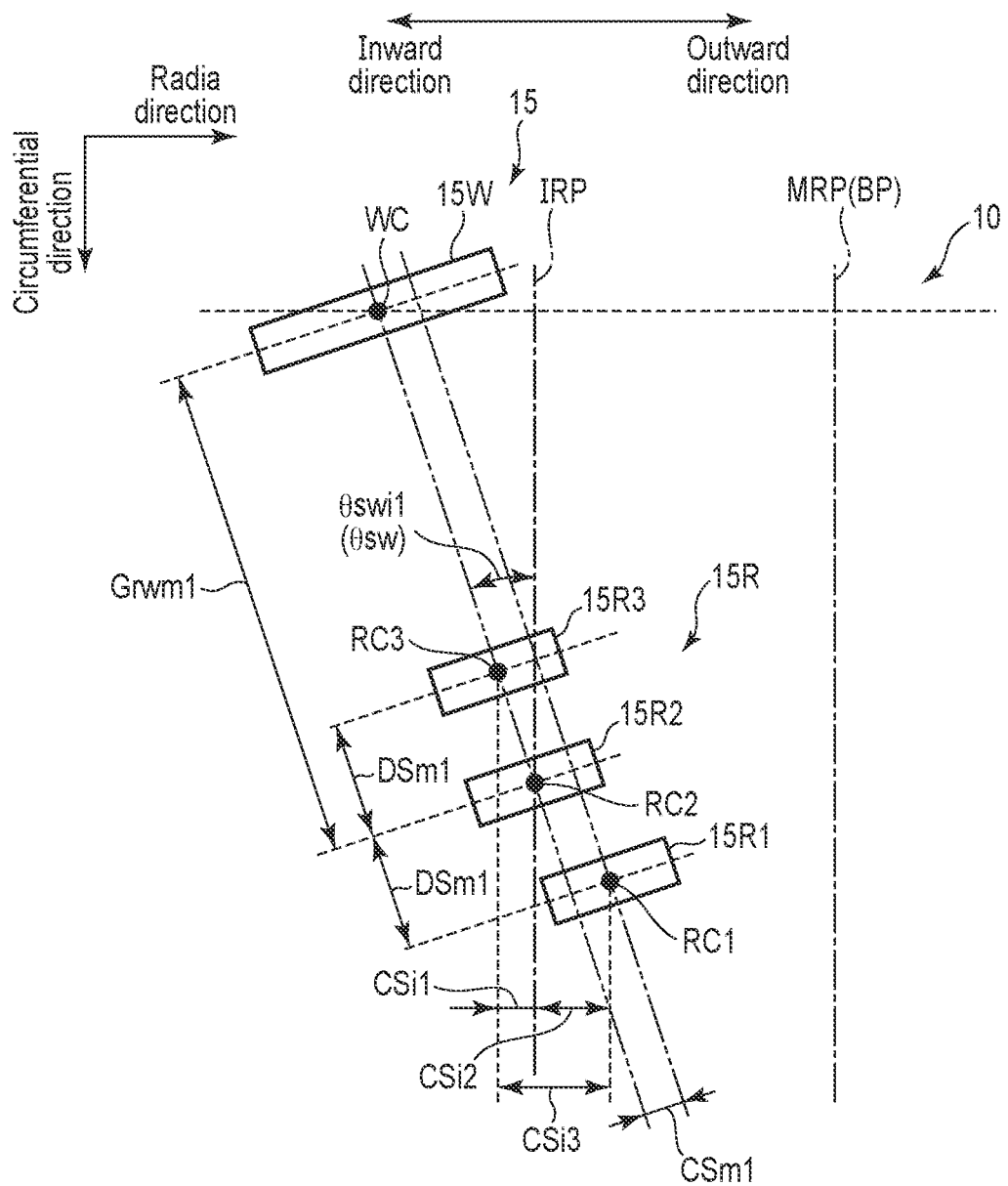
FIG. 20 is a schematic diagram illustrating an example of the geometric arrangement of a write head and three read heads in the case in which the read heads according to the first modification is positioned at a radial position.

FIG. 20 is a schematic diagram illustrating an example of the geometric arrangement of the write head 15W and the three read heads 15R1, 15R2, and 15R3 in the case in which the read head 15R2 according to the first modification is positioned at the radial position IRP.

In the example illustrated in FIG. 20, in the case in which the read head 15R2 is disposed at the radial position IRP, the write head 15W, the read head 15R1, the read head 15R2, and the read head 15R3 are inclined inward at a skew angle $\propto sw=\theta swi1$ to an axis extending in the circumferential direction.

In the example illustrated in FIG. 20, in the case in which the read head 15R2 is disposed at the radial position IRP, the write head 15W, the read head 15R1, the read head 15R2, and the read head 15R3 are displaced in the radial direction. It should be noted that in the case in which the read head 15R2 is disposed at the radial position IRP, the write head 15W, the read head 15R1, the read head 15R2, and the read head 15R3 do not necessarily have to be displaced in the radial direction. In the case in which the read head 15R2 is disposed at the radial position IRP, the cross track interval between the read heads 15R1 and 15R2 is a distance CSi2. In the case in which the read head 15R2 is disposed at the radial position IRP, the cross track interval between the read heads 15R2 and 15R3 is the distance CSi1. The cross track interval between the read heads 15R1 and 15R3 is a distance CSi3. For example, the cross track interval CSi2 is larger than the cross track interval CSi1. For example, the cross track interval CSi3 is larger than the cross track interval CSI2. In one example, the cross track interval CSi3 is the maximum value of the cross track interval between two read heads 15P among the read heads 15R1, 15R2, and 15R3 in the case in which the head 15, e.g. the read head 15R2, is positioned in the user data region 10a. It should be noted that the cross track interval CSi3 does not necessarily have to be the maximum value of the cross track interval between two read heads 15R among the read heads 15R1, 15R2, and 15R3 in the case in which the head 15, e.g. the read head 15R2 is positioned in the user data region 10a.

Figure 21:
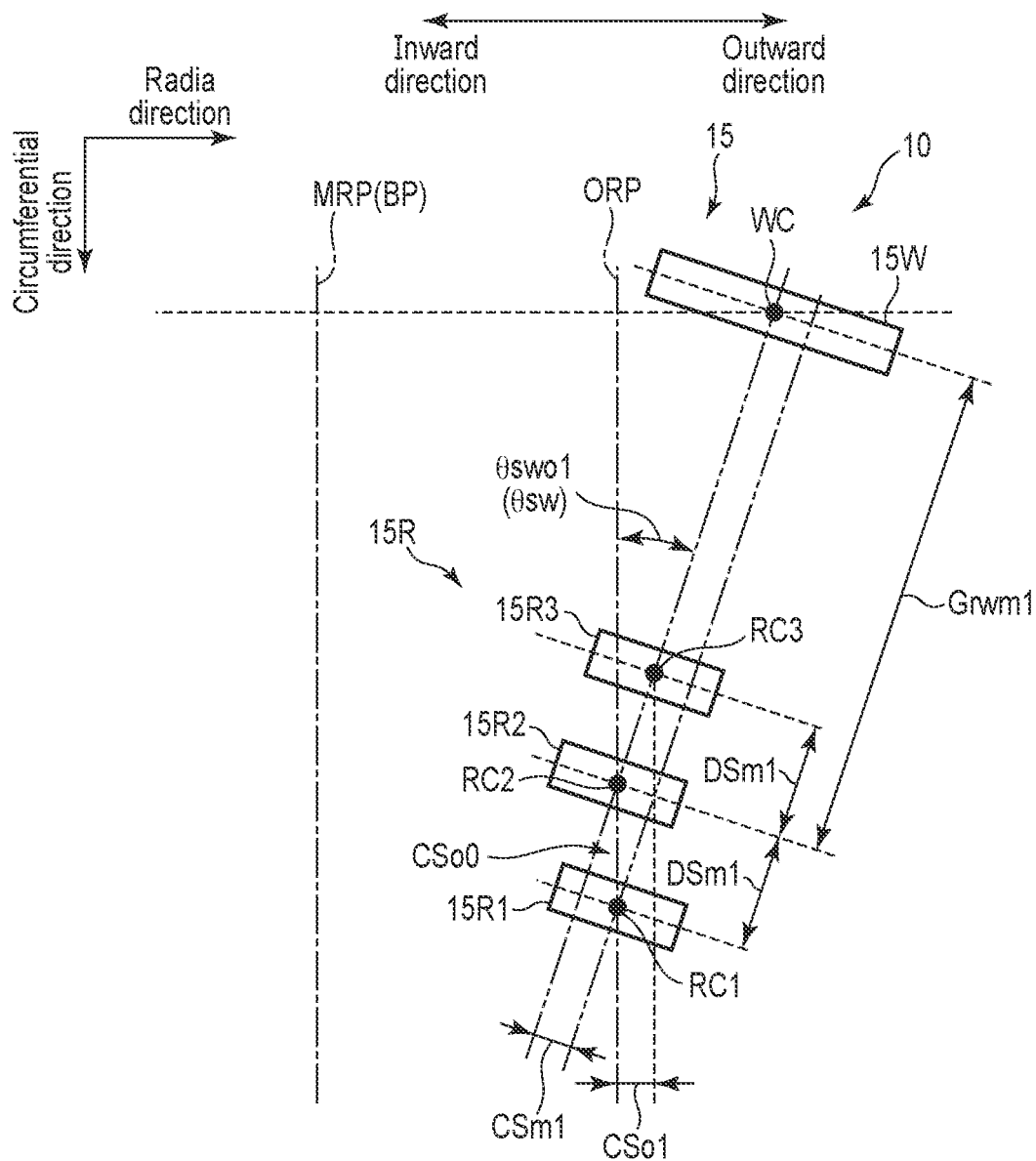
FIG. 21 is a schematic diagram illustrating an example of the geometric arrangement of a write head and three read heads in the case in which the read heads according to the first modification is positioned at a radial position.

FIG. 21 is a schematic diagram illustrating an example of the geometric arrangement of the write head 15W and the three read heads 15R1, 15R2, and 15R3 in the case in which the read head 15R2 according to the first modification is positioned at the radial position ORP.

In the example illustrated in FIG. 21, in the case in which the read head 15R2 is disposed at the radial position ORP, the write head 15W, the read head 15R1, the read head 15R2, and the read head 15R3 are inclined outward at a skew angle θsw=θswo1 to an axis extending in the circumferential direction. For example, the skew angle θswo1 is the same as the skew angle θswi1. It should be noted that the skew angle θswo1 may be different from the skew angle θswi. The skew angle θswo1 may be larger than the skew angle θswi, for example. The skew angle θswo1 may be smaller than the skew angle θswi, for example.

In the example illustrated in FIG. 21, in the case in which the read head 15R2 is disposed at the radial position ORP, the write head 15W, the read head 15R1, the read head 15R2, and the read head 15R3 are displaced in the radial direction. It should be noted that in the case in which the read head 15R2 is disposed at the radial position ORP, the write head 15W, the read head 15R1, the read head 15R2, and the read head 15R3 do not necessarily have to be displaced in the radial direction. In the case in which the read head 15R2 is disposed at the radial position ORP, the cross track interval between the read heads 15R1 and 15R2 is the distance CSo0=0. In the case in which the read head 15R2 is disposed at the radial position ORP, the cross track interval between the read heads 15R2 and 15R3 is the distance CSo1. In the case in which the read head 15R2 is disposed at the radial position ORP, the cross track interval between the read heads 15R1 and 15R3 is the distance CSo1. For example, the cross track interval CSo1 is larger than the cross track interval CSo0 (=0).

According to the first modification, the magnetic disk device 1 has the write head 15W and the head 15 having the plurality of read heads 15R (15R1, 15R2, and 15R3). The magnetic disk device 1 preferentially sets the minimum cross track interval region in the normal recording region CR, and normally records data in the minimum cross track interval region. The magnetic disk device 1 preferentially sets the maximum cross track interval region to the shingled recording region SR, and shingle-records data in the maximum cross track interval region. Even in the case in which the head 15 fluctuates to the track center of a particular track due to the influence of external vibration or the like, the magnetic disk device 1 can normally read this track using any read head 15R of the plurality of read heads 15R. Accordingly, the magnetic disk device 1 can suppress the degradation in the read performance.

(Second Modification)

A magnetic disk device 1 according to the second modification is different from the magnetic disk device 1 according to the above-described embodiment in the configuration of the head 15.

Figure 22:
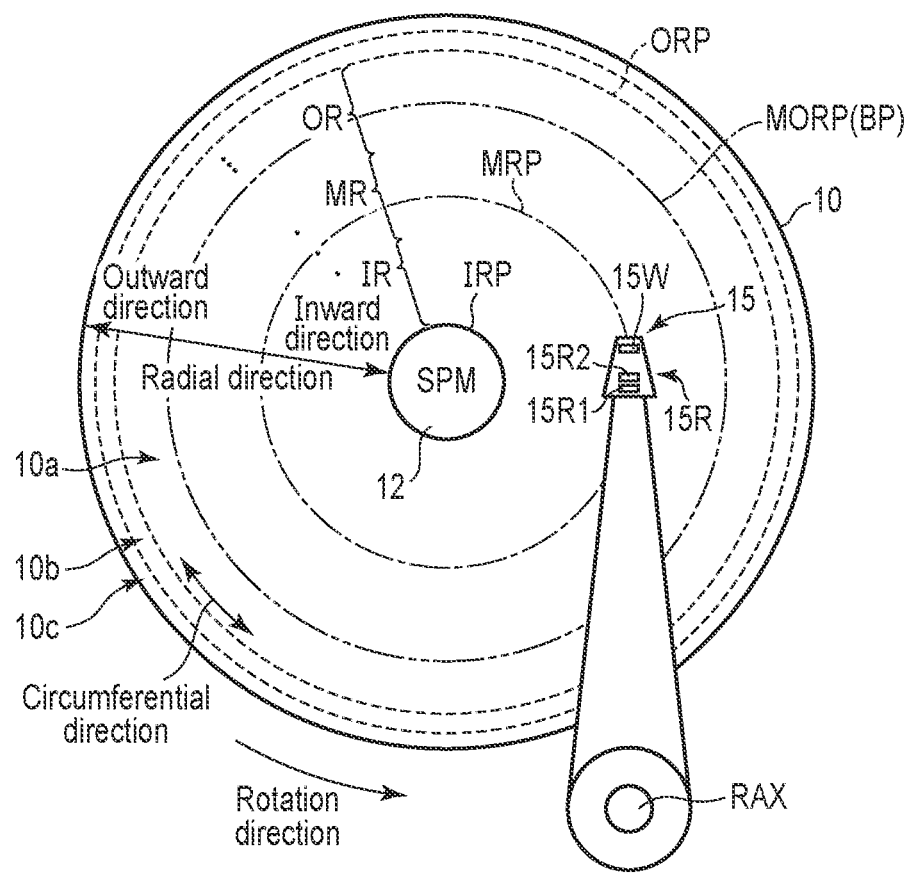
FIG. 22 is a schematic diagram illustrating an example of the arrangement of heads to a disk according to a second modification.

FIG. 22 is a schematic diagram illustrating an example of the arrangement of a head 15 to a disk 10 according to the second modification.

In the example illustrated in FIG. 22, the user data region 10a is divided into the inner circumferential region IR located in the inward direction, the outer circumferential region OR located in the outward direction, and the middle circumferential region MR located between the inner circumferential region IR and the outer circumferential region OR. In FIG. 22, the user data region 10a includes a radial position IRP, a radial position MRP, a radial position MORP, and a radial position ORP. The radial position MORP is located between the radial position MRP and the radial position ORP. In FIG. 22, the radial position MORP is located in the outer circumferential region OR. It should be noted that the radial position MORP may be located in the middle circumferential region MR.

Figure 23:
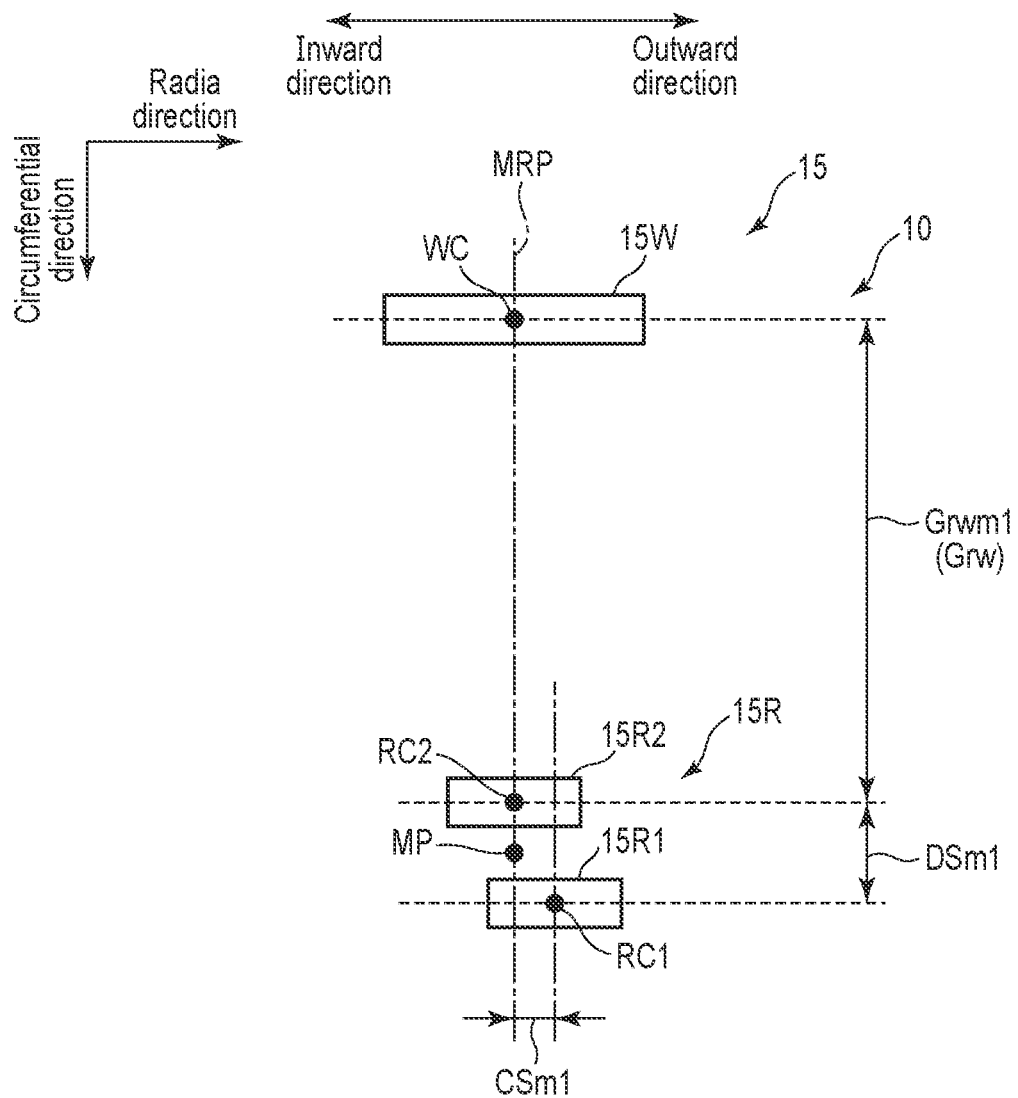
FIG. 23 is a schematic diagram illustrating an example of the geometric arrangement of a write head and two read heads in the case in which an intermediate part according to the second modification is positioned at a radial position.

FIG. 23 is a schematic diagram illustrating an example of the geometric arrangement of a write head 15W and two read heads 15R1 and 15R2 in the case in which the intermediate part MP according to the second modification is positioned at the radial position MRP. FIG. 23 illustrates the center part WC of the write head 15W, the center part RC1 of the read head 15R1, and the center part RC2 of the read head 15R2. In the example illustrated in FIG. 23, the intermediate part MP is disposed or positioned at a target position, and data is written/read.

In the example illustrated in FIG. 23, in the case in which the intermediate part MP is disposed at the radial position MRP, the write head 15W and the read head 15R2 are arranged along the circumferential direction. The write head 15W, the read head 15R2, and the read head 15R1 are not arranged along the circumferential direction. In the case in which the intermediate part MP is disposed at the radial position MRP, the down track interval (DTS) between the read heads 15R1 and 15R2 is the distance DSm1.

In the example illustrated in FIG. 23, in the case in which the intermediate part MP is disposed at the radial position MRP, the write head 15W and the read head 15R2 are not displaced in the radial direction. In other words, the write head 15W and the read head 15R2 are located at the radial position MRP. It should be noted that in the case in which the intermediate part MP is disposed at the radial position MRP, the write head 15W and the read head 15R2 may be displaced in the radial direction. In the case in which the intermediate part MP is disposed at the radial position MRP, the write head 15W and the read head 15R2 are displaced from the read head 15R1 in the radial direction. It should be noted that in the case in which the intermediate part MP is disposed at the radial position MRP, the write head 15W, the read head 15R2, and the read head 15R1 do not necessarily have to be displaced in the radial direction. In FIG. 23, the skew angle θsw of the head 15 is 0. In the case in which the intermediate part MP is disposed at the radial position MRP, the cross track interval (CTS) between the read heads 15R1 and 15R2 is the distance CSm1. It should be noted that in the case in which the intermediate part MP is disposed at the radial position MRP, the write head 15W, the read head 15R1, and the read head 15R2 may be displaced in the radial direction.

Figure 24:
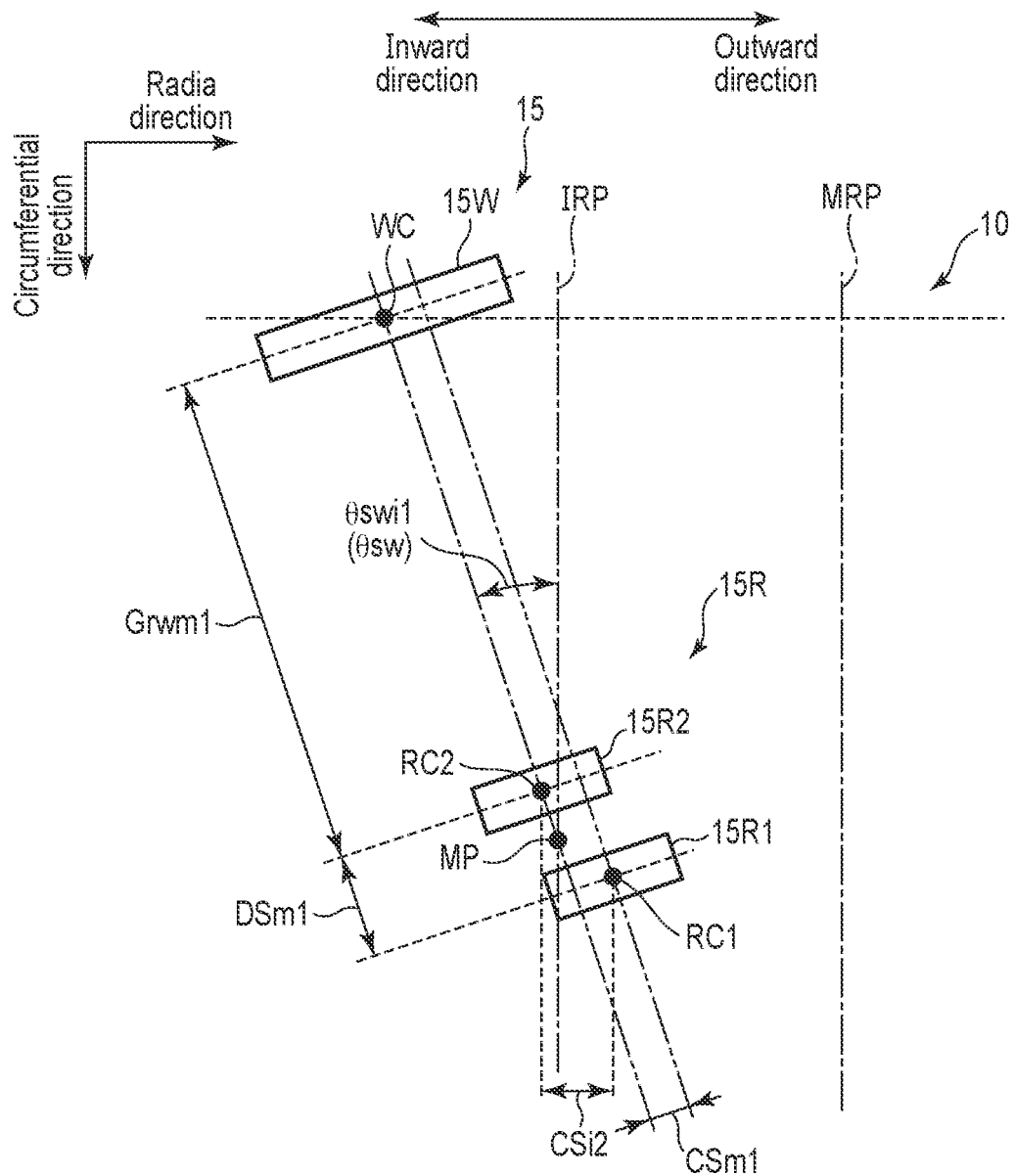
FIG. 24 is a schematic diagram illustrating an example of the geometric arrangement of a write head and two read heads in the case in which the intermediate part according to the second modification is positioned at a radial position.

FIG. 24 is a schematic diagram illustrating an example of the geometric arrangement of the write head 15W and the two read heads 15R1 and 15R2 in the case in which the intermediate part MP according to the second modification is positioned at the radial position IRP.

In the example illustrated in FIG. 24, in the case in which the intermediate part MP is disposed at the radial position IRP, the write head 15W, the read head 15R1, and the read head 15R2 are inclined inward at a skew angle θsw=θswi1 to an axis extending in the circumferential direction.

In the example illustrated in FIG. 24, in the case in which the intermediate part MP is disposed at the radial position IRP, the write head 15W, the read head 15R1, and the read head 15R2 are displaced in the radial direction. It should be noted that in the case in which the intermediate part MP is disposed at the radial position IRP, the write head 15W, the read head 15R1, and the read head 15R2 do not necessarily have to be displaced in the radial direction. In the case in which the intermediate part MP is disposed at the radial position IRP, the cross track interval between the read heads 15R1 and 15R2 is the distance CSi2. For example, the cross track interval CSi2 is larger than the cross track interval CSm1. The cross track interval CSi2 is the maximum value of the cross track interval between the read heads 15R1 and 15R2 in the case in which the head 15, e.g. the intermediate part MP is positioned in the user data region 10a. It should be noted that the cross track interval CSi2 does not necessarily have to be the maximum value of the cross track interval between the read heads 15R1 and 15R2 in the case in which the head 15, e.g. the intermediate part MP is positioned in the user data region 10a.

Figure 25:
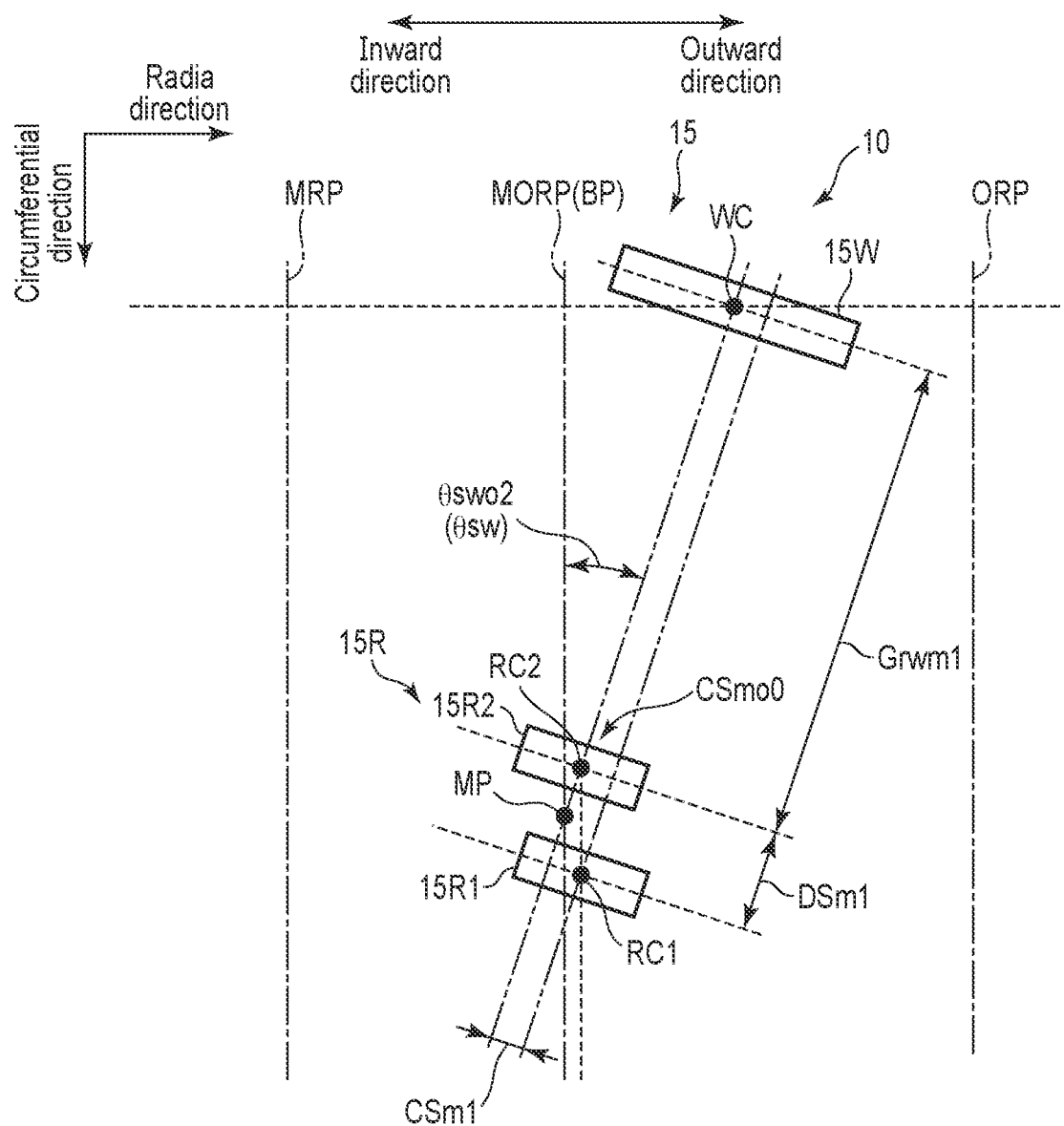
FIG. 25 is a schematic diagram illustrating an example of the geometric arrangement of a write head and two read heads in the case in which an intermediate part according to the second modification is positioned at a radial position.

FIG. 25 is a schematic diagram illustrating an example of the geometric arrangement of the write head 15W and the two read heads 15R1 and 15R2 in the case in which the intermediate part MP according to the second modification is positioned at the radial position MORP.

In the example illustrated in FIG. 25, in the case in which the intermediate part MP is disposed at the radial position MORP, the write head 15W, the read head 15R1, and the read head 15R2 are inclined outward at a skew angle θsw=θswo2 to an axis extending in the circumferential direction. For example, the absolute value of the skew angle θswo2 is smaller than the absolute value of the skew angle θswi1. It should be noted that the absolute value of the skew angle θswo2 may be different from the absolute value of the skew angle θswi1. The absolute value of the skew angle θswo2 may be larger than the absolute value of the skew angle θswi1, for example. The skew angle θswo2 may be, e.g. the same as the skew angle θswi1.

In the example illustrated in FIG. 25, in the case in which the intermediate part. MP is disposed at the radial position MORP, the write head 15W, the read head 15R1, and the read head 15R2 are displaced in the radial direction. It should be noted that in the case in which the intermediate part MP is disposed at the radial position MORP, the write head 15W, the read head 15R1, and the read head 15R2 do not necessarily have to be displaced in the radial direction. In the case in which the intermediate part MP is disposed at the radial position MORP, the cross track interval between the read heads 15R1 and 15R2 is the distance CSmo0=0. That is, in the case in which the intermediate part MP is disposed at the radial position MORP, the read heads 15R1 and 15R2 are not displaced in the radial direction. In other words, in the case in which the intermediate part MP is disposed at the radial position MORP, the read heads 15R1 and 15R2 are located at the same radial position. In the example illustrated in FIG. 25, the radial position MORP corresponds to the reference position BP.

FIG. 26 is a schematic diagram illustrating an example of the geometric arrangement of the write head 15W and the two read heads 15R1 and 15R2 in the case in which the intermediate part MP according to the second modification is positioned at the radial position ORP.

In the example illustrated in FIG. 26, in the case in which the intermediate part MP is disposed at the radial position ORP, the write head 15W, the read head 15R1, and the read head 15R2 are inclined outward at a skew angle θsw=θswo1 to an axis extending in the circumferential direction. For example, the skew angle θswo1 is the same as the skew angle θswi1. It should be noted that the skew angle θswo1 may be different from the skew angle θswi. The skew angle θswo1 may be larger than the skew angle θswi, for example. The skew angle θswo1 may be smaller than the skew angle θswi, for example.

In the example illustrated in FIG. 26, in the case in which the intermediate part MP is disposed at the radial position ORP, the write head 15W, the read head 15R1, and the read head 15R2 are displaced in the radial direction. It should be noted that in the case in which the intermediate part MP is disposed at the radial position ORP, the write head 15W, the read head 15R1, and the read head 15R2 do not necessarily have to be displaced in the radial direction. In the case in which the intermediate part MP is disposed at the radial position ORP, the cross track interval between the read heads 15R1 and 15R2 is the distance CSo2. For example, the cross track interval CSo2 is smaller than the cross track interval CSm1.

Figure 27:
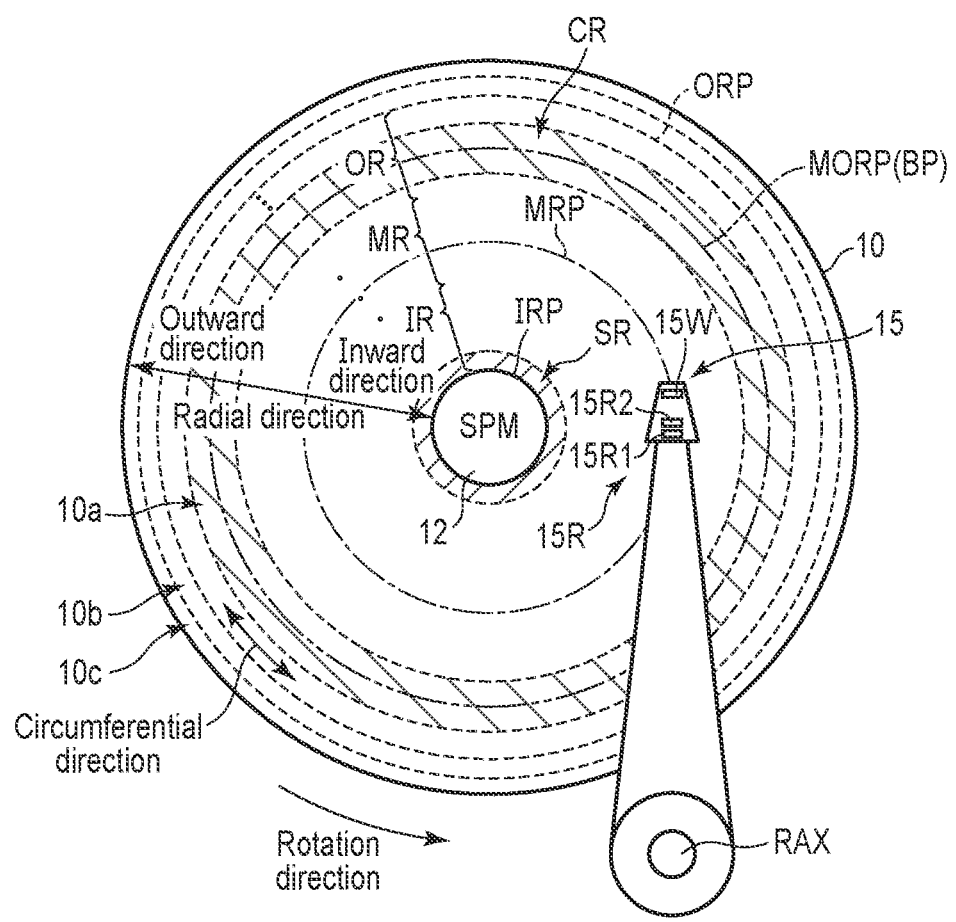
FIG. 27 is a schematic diagram illustrating an example of the arrangement of a normal recording region and a shingled recording region according to the second modification.

FIG. 27 is a schematic diagram illustrating an example of the arrangement of the normal recording region CR and the shingled recording region SR according to the second modification.

In the example illustrated in FIG. 27, the MPU 60 sets the minimum cross track interval region including the radial position MORP (reference position BP) to the normal recording region CR. In FIG. 27, the normal recording region (minimum cross track interval region) CR is indicated by oblique lines rising to the left. The MPU 60 sets the maximum cross track interval region including the radial position IRP in the shingled recording region SR. In FIG. 27, the shingled recording region SR is indicated by oblique lines rising to the right. Preferably, the data is normally recorded by preferentially setting the normal recording region CR in the radial region on the outer circumferential side having a higher transfer speed (or transfer rate) than the radial region on the inner circumferential side in the disk 10, and the data is shingle-recorded by preferentially setting the shingled recording region SR in the radial region on the inner circumferential side having a lower transfer speed (or transfer rate) than the radial region on the outer circumferential side in the disk 10. For example, after normally recording data on the entire surface of the user data region 10a of the disk 10, the MPU 60 preferentially overwrites the data by shingled recording from the inner side of the radial position MRP or the reference position BP of the user data region 10a.

According to the present embodiment, the magnetic disk device 1 has the write head 15W and the head 15 having the plurality of read heads 15R (15R1 and 15R2). Preferably, the data is normally recorded by setting the normal recording region CR in the radial region on the outer circumferential side having a higher transfer speed (or transfer rate) than the radial region on the inner circumferential side in the disk 10, and the data is shingle-recorded by setting the shingled recording region SR in the radial region on the inner circumferential side having a lower transfer speed (or transfer rate) than the radial region on the outer circumferential side in the disk 10. Therefore, in the magnetic disk device 1, the read heads 15R1 and 15R2 are provided such that the reference position BP is located in a region on the outer side of the disk 10. In other words, in the magnetic disk device 1, the read heads 15R1 and 15R2 are provided such that the radial position at which the cross track interval takes the minimum value is located in the region on the outer side of the disk 10. Therefore, even in the case in which the head 15 fluctuates to the track center of a particular track due to the influence of external vibration or the like, the magnetic disk device 1 can normally read this track using any of the read heads 15R of the plurality of read heads 15R. Accordingly, the magnetic disk device 1 can suppress the degradation in the read performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a normal recording region in which data is written in a normal recording in which a track is written at an interval in a radial direction and a shingled recording region in which data is written in a shingled recording in which a track is written in an overlapping manner in the radial direction;
a head including a write element which writes data to the disk and a plurality of read elements which read data from the disk, the head moving on the disk by rotation about a rotation axis, the head accessing one side of the disk with one and recording and reproducing the data; and
a controller which selects and executes the normal recording and the shingled recording, wherein
a first minimum value of a cross track interval in the radial direction of the disk between two read elements in the plurality of read elements in the normal recording region is smaller than a first maximum value of the cross track interval in the shingled recording region.

2. The magnetic disk device according to claim 1, wherein when two read elements in the plurality of read elements overlap with each other, the cross track interval takes the first minimum value.

3. The magnetic disk device according to claim 1, wherein a first radial position in the radial direction of the head in the disk where the cross track interval takes the first minimum value is located on an outer side of the disk from a middle of a width in the radial direction of the disk.

4. The magnetic disk device according to claim 3, wherein the normal recording region is disposed on the outer side, and the shingled recording region is disposed on an inner side of the disk.

5. The magnetic disk device according to claim 1, wherein the controller writes data by the normal recording on an entire surface of the disk, and the controller then writes data by the shingled recording on a center side of the disk.

6. The magnetic disk device according to claim 1, wherein the controller executes the normal recording in a first region of the disk in which a second minimum value of the cross track interval is 10 nm or less, and executes the shingled recording in a second region of the disk in which a second maximum value of the cross track interval is 15 nm or more.

7. A magnetic disk device comprising:
a disk,
a head including a write element which writes data to the disk, and a first read dement and a second read element which read data from the disk, the head moving on the disk by rotation about a rotation axis the head accessing one side of the disk with one and recording and reproducing the data; and
a controller which selects and executes normal recording in which a track is written at an interval in a radial direction of the disk and shingled recording in which a track is written in an overlapping manner in the radial direction, and executes normal recording in the case in which the head is disposed at a first radial position in the radial direction of the disk at which a cross track interval in the radial direction of the disk between the first read element and the second read element takes a minimum value.

8. The magnetic disk device according to claim 7, wherein the controller executes shingled recording when the head is disposed at a second radial position in the radial direction of the disk at which the cross track interval takes a maximum value.

9. The magnetic disk device according to claim 8, wherein the first radial position is located in a middle of a radial width of the disk.

10. The magnetic disk device according to claim 8, wherein the first radial position is located on an outer side of the disk from a middle of a radial width of the disk.

11. The magnetic disk device according to claim 9, wherein the second radial position is located on an inner side of the middle.

12. The magnetic disk device according to claim 9, wherein the second radial position is located on an outer side of the middle.

13. The magnetic disk device according to claim 7, wherein when the head is disposed at the first radial position, the first read element and the second read element arranged in a circumferential direction of the disk.

14. A write processing method applied to a magnetic disk device including a disk, and a head including a write element which writes data to the disk, and a first read element and a second read element which read data from the disk, the head moving on the disk by rotation about a rotation axis the head accessing one side of the disk with one and recording and reproducing the data, the method comprising:
selecting and executing normal recording in which a track is written at an interval in a radial direction of the disk and shingled recording in which a track is written in an overlapping manner in the radial direction; and
executing normal recording when the head is disposed at a first radial position in a radial direction of the disk at which a cross track interval in the radial direction of the disk between the first read element and the second read element takes a minimum value.

15. The write processing method according to claim 14, further comprising:
executing shingled recording when the head is disposed at a second radial position in the radial direction of the disk at which the cross track interval takes a maximum value.

16. The write processing method according to claim 15, wherein the first radial position is located in a middle of a radial width of the disk.

17. The write processing method according to claim 15, wherein the first radial position is located on an outer side of the disk from a middle of a radial width of the disk.

18. The write processing method according to claim 16, wherein the second radial position is located on an inner side of the middle.

19. The write processing method according to claim 16, wherein the second radial position is located on an outer side of the middle.

20. The write processing method according to claim 14, wherein when the head is disposed at the first radial position, the first read head and the second read head are arranged in a circumferential direction of the disk.

* * * * *